United States Patent [19]

Sudo

[11] Patent Number: 5,719,701
[45] Date of Patent: Feb. 17, 1998

[54] IMAGE DISPLAY DEVICE AND STEREOSCOPIC IMAGE DISPLAY APPARATUS USING THE SAME

[75] Inventor: Toshiyuki Sudo, Tokyo, Japan

[73] Assignee: Canon Kabushiki Kaisha, Tokyo, Japan

[21] Appl. No.: 651,731

[22] Filed: May 22, 1996

[30] Foreign Application Priority Data

May 24, 1995 [JP] Japan .................. 7-149540

[51] Int. Cl.$^6$ .................. G02B 27/22; G02F 1/13; H04N 13/04; H04N 15/00
[52] U.S. Cl. .................. 359/464; 359/462; 348/52; 348/56; 348/752; 348/780; 345/32; 345/90
[58] Field of Search .................. 359/462, 464; 349/57; 348/55, 56, 740, 750, 751, 757, 780, 782, 52; 345/32, 84, 90, 151; 353/7, 89

[56] References Cited

U.S. PATENT DOCUMENTS

| | | | |
|---|---|---|---|
| 5,125,733 | 6/1992 | Lee | 359/462 |
| 5,357,288 | 10/1994 | Hiroshima et al. | 348/742 |
| 5,481,320 | 1/1996 | Konuma et al. | 348/751 |
| 5,534,949 | 7/1996 | Baron | 348/750 |
| 5,541,401 | 7/1996 | Nilsson | 345/32 |
| 5,555,035 | 9/1996 | Mead et al. | 348/751 |

*Primary Examiner*—Jon W. Henry
*Attorney, Agent, or Firm*—Morgan & Finnegan LLP

[57] ABSTRACT

The present invention relates to an image display device comprising a plurality of image display means for displaying a plurality of bits of time-serial image information from image producing means, shutter means corresponding to the plurality of image display means and transmitting or not transmitting a light beam therethrough, an imaging optical system for imaging the plurality of bits of time-serial image information on the same area on a common imaging plane, and control means for repeating to bring about a state in which only one of the plurality of shutter means transmits a light beam therethrough for a predetermined time with a predetermined time difference to thereby image the plurality of bits of image information successively on the imaging plane.

13 Claims, 19 Drawing Sheets

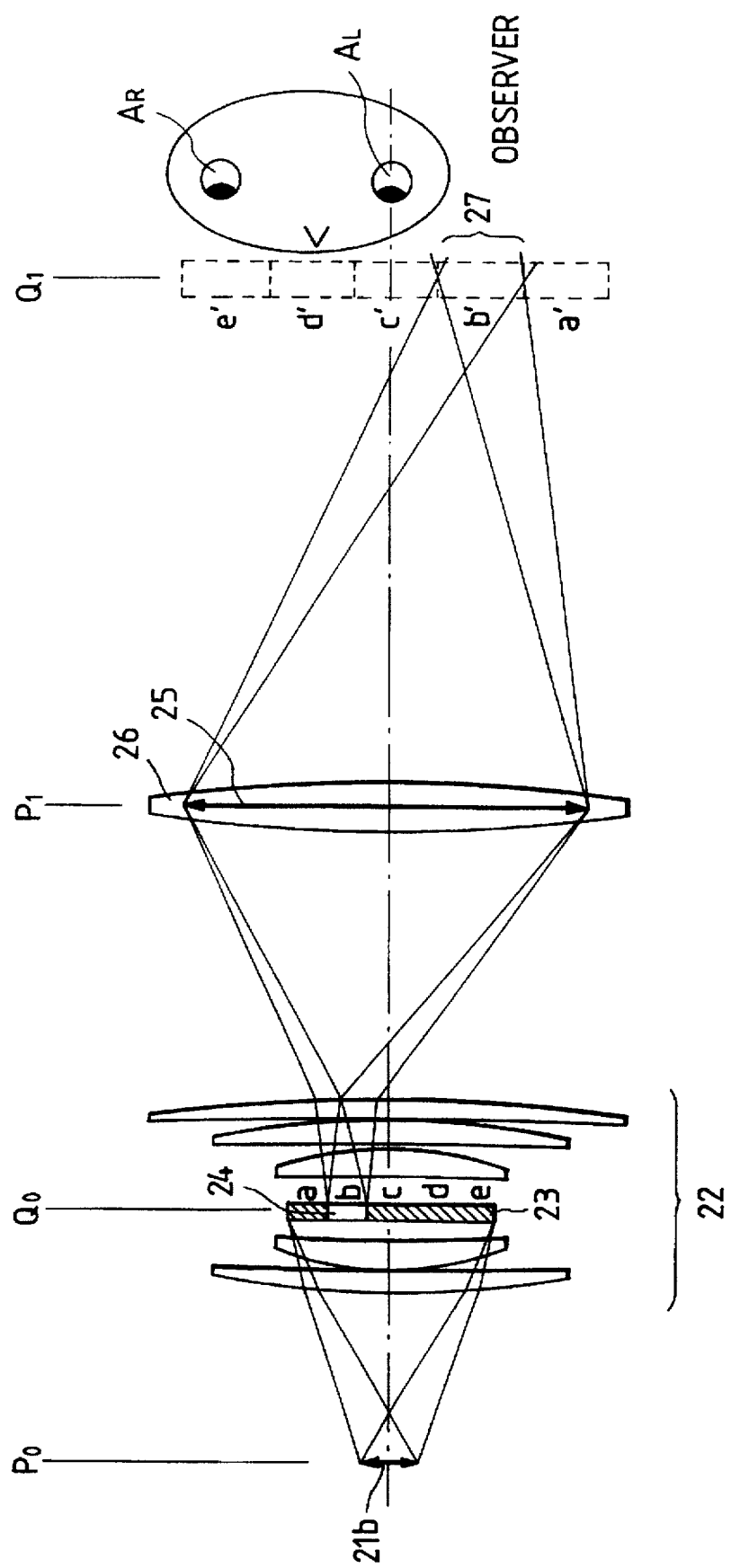

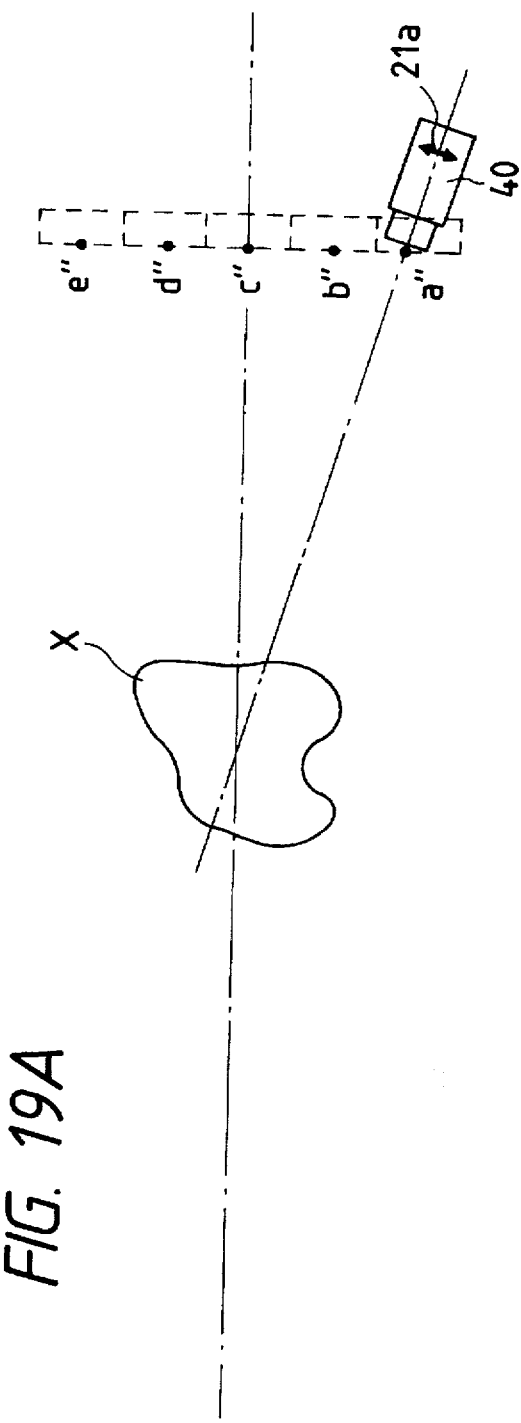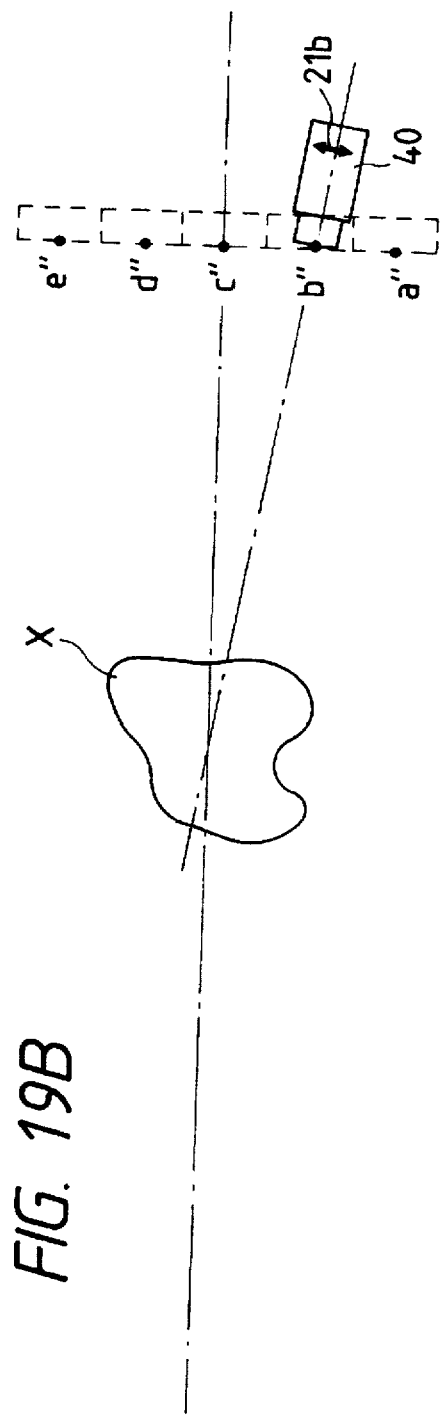

IMAGE DISPLAY DEVICE AND STEREOSCOPIC IMAGE DISPLAY APPARATUS USING THE SAME

BACKGROUND OF THE INVENTION

1. Field of the Invention

This invention relates to an image display device and a stereoscopic image reproducing apparatus utilizing the same, and particularly is suitable when displaying a number of images at high speed by the use of a liquid crystal display and thereby displaying a moving image and when reproducing a stereoscopic image.

2. Related Background Art

There is known an image display device for displaying a moving image by the use of a liquid crystal device (hereinafter abbreviated as LCD). In this case, twenty or more images are displayed for a second to thereby display a moving image (this is called conventional art example 1).

Also, U.S. Pat. No. 5,132,839 discloses a stereoscopic image reproducing apparatus for reproducing a stereoscopic image by the utilization of the image display device as described above (this is called conventional art example 2). FIG. 16 of the accompanying drawings is an illustration of the principle of this stereoscopic image reproducing apparatus and is a schematic view of the essential portions of the stereoscopic image reproducing apparatus as it is seen vertically from above it.

In FIG. 16, the reference numeral 20 designates the image display device of conventional art example 1. The reference numeral 21 denotes a displayed image displayed on the display screen of the image display device lying on a plane $P_0$. The reference numeral 22 designates a projection lens which enlarges the displayed image 21 and forms an enlarged image 25 on a plane $P_1$. The reference numeral 23 denotes a light valve which is installed on the aperture position (plane $Q_0$) of the projection lens 22 and mechanically or electrically produces a transmitting portion and an intercepting portion for light, and varies the area of the light transmitting portion (aperture) 24 with time. The reference numeral 26 designates a large convex lens which is installed at the position of a plane $P_1$ on which an enlarged image 25 is formed, and forms the image 27 of the aperture 24 in the light valve 23 on a plane $Q_1$.

The action of this stereoscopic image reproducing apparatus will now be described. The displayed image 21 displayed on the display screen of the image display device 20 is enlarged by the projection lens 22 and forms the enlarged image 25 on the plane $P_1$ on which the large convex lens 26 lies. At this time, the area of the aperture 24 in the light valve 23 varies with time. Consequently, at a certain moment, the path of the light beam forming the enlarged image 25 is restricted to only some of light beams entering the projection lens 22, as shown.

The large convex lens 26 forms the real image of the aperture 24 on the plane $Q_1$ with the aperture 24 on the plane $Q_0$ as an entrance pupil, and forms an exit pupil 27.

Consequently, in this case, the light beams which have contributed to the formation of the enlarged image 25 all pass through the exit pupil 27, and if the large convex lens 26 is looked at with the eyes placed at the position of the exit pupil 27, the enlarged image 25 can be observed without "eclipse".

In this case, however, the size of the exit pupil 27 is much smaller than the width of the two eyes of an observer and therefore, the observer cannot observe the enlarged image 25 at a time with his/her two eyes.

This stereoscopic image reproducing apparatus enables the observation of a stereoscopic image to be accomplished by a method which will hereinafter be described. FIG. 17 of the accompanying drawings is an illustration of the operation of this stereoscopic image reproducing apparatus at a time Ta, and FIG. 18 of the accompanying drawings is an illustration of the operation of this stereoscopic image reproducing apparatus at a time Tb after the lapse of a minute time from the time Ta. In these figures, $A_R$ designates the observer's right eye and $A_L$ denotes the observer's left eye.

At the time Ta shown in FIG. 17, an image 21a formed by a cubic object X being photographed from a position a" as shown in FIG. 19A of the accompanying drawings is first displayed as a displayed image to be displayed on the display surface of the image display device 20. At this time, the aperture 24 in the light valve 23 is formed on an area a. The exit pupil 27 at this time is formed on an area a' on the exit pupil plane $Q_1$, and the light beams forming the enlarged image 25 all pass through the area a'. So, if the large convex lens 26 is looked at with the eyes placed on this area a', the image resulting from the object X having been looked at from a position a" can be observed. Next, at the time Tb, an image 21b obtained by the cubic object X being photographed from a position b" as shown in FIG. 19B of the accompanying drawings is displayed as a displayed image to be displayed on the display surface of the image display device 20. At this time, the aperture 24 in the light valve 23 is formed on an area b. So, the exit pupil 27 at this time is formed within a range b' on the exit pupil plane $Q_1$, and the light beams forming the enlarged image 25 all pass through the area b'. So, if the large convex lens 26 is looked at with the eyes placed on this area b', an image resulting from the object X having been looked at from the position b" can be observed.

In the same manner, at times Tc, Td and Te, images 21c, 21d and 21e formed by the cubic object X being photographed from positions c", d" and e", respectively, are displayed as images to be displayed on the display surface of the image display device 20, and these form enlarged images 25a, 25b, 25c and 25d by the projection lens 22. At this time, the aperture 24 in the light valve 23 moves to areas c, d and e and the exit pupil 27 changes its area to c', d' and e' on the exit pupil plane $Q_1$.

The images 25a–25e are images each having a parallax and therefore, if suitable parallax images are observed independently of each other with the right eye $A_R$ and the left eye $A_L$, stereoscopic viewing will become possible. When as shown, for example, in FIGS. 17 and 18, the observer's left eye $A_L$ is near the exit pupil c' and the observer's right eye $A_R$ is near the exit pupil e', the observer observes the image 25c with his left eye $A_L$ and the image 25e with his right eye $A_R$ before and after in terms of time, but if this time difference is a very short time, the observer can recognize a stereoscopic image by the afterimage effect as when the parallax images are presented to the left and right eyes at a time (this phenomenon also holds true when the observer's two eyes exist near other exit pupils).

Consequently, if the period of said movement of the exit pupil (for example, the time from after the exit pupil has moved from the area a' until it returns to the original area a') is set to less than man's afterimage allowance time (about 1/30 sec.), the observer can do stereoscopic viewing by this stereoscopic image reproducing apparatus and at that time, hardly recognizes the changeover of the enlarged image 25, the movement of the exit pupils a'–e', flicker, etc.

Also, if the observer observes the enlarged image 25 with his both eyes placed at any positions within a range reached by rays of light emerging through the exit pupil of one of the areas a'–e', he can observe a stereoscopic image through such a wide pupil that the above-described exit pupils a'–e' are linked together.

The above-described conventional art examples suffer from problems which will hereinafter be described. In the image display device using the liquid crystal of conventional art example 1, the response time of liquid crystal molecules is relatively long (in the present day LCD, the order of several tens of milliseconds) and therefore, the depiction time per image is restricted to a predetermined value or greater.

FIG. 20 of the accompanying drawings is a graph showing the waveform of a driving voltage signal V applied to a picture element constituting the LCD and the waveform of the light transmission output T of the liquid crystal in the picture element. (To simplify the description, the liquid crystal herein is unified and described as one of normally white mode, but in the present invention, even if use is made of liquid crystal of normally black mode, it will spoil the practicality and effect of the invention in no way.) It is to be understood that the driving voltage of the liquid crystal is a voltage applied to between the electrodes of the liquid crystal and in order to prevent the burning of the liquid crystal, inverted drive is periodically effected as shown.

In FIG. 20, the amplitude of the driving voltage signal applied between times t1 and t2 is minimum (Vmin) and the light transmission output exhibits a maximum value (Tmax). When at the time T2, the amplitude of the driving voltage signal is changed over to a maximum value (Vmax), the light transmission output decreases, but due to the response time difference of the liquid crystal for a variation in electric field, it is at a time t3 that the light transmission output reaches a minimum value (Tmin). At this time, τ1=t3–t2 is defined as a positive response time.

Next, when at a time t4, the amplitude of the driving voltage signal is again changed over to the minimum value (Vmin), the light transmission output reaches the maximum value (Tmax) at a time t5 after a predetermined time lag has been consumed. At this time, τ2=t5–t4 is defined as a negative response time.

In the case of a TFT (thin film transistor) type LCD, a driving voltage applied to the electrode of each picture element can be held for a predetermined time by the TFT and therefore, even when the variation in the voltage V with time as described above is caused, it is possible to make the voltage signal applied to the TFT such as VT in FIG. 20 in which the voltage application time is shorter than the response time of the liquid crystal.

When the positive or negative response time is sufficiently small, an image can be visually seen without any problem even if the amplitude switching frequency of the driving voltage signal is made high. However, if the amplitude switching frequency of the driving voltage signal is made high when the response time is great, there will continue a state in which the driving voltage signal changes over to another voltage value before a desired light transmission output is obtained and therefore, the contrast of the image will be reduced and the display of a moving image will become difficult.

The response time of popular LCDs is several tens to 100 msec. for both the positive and the negative and therefore, to reproduce a moving image of high contrast, the amplitude switching frequency of the driving voltage signal must be suppressed to several Hz to several tens of Hz at greatest. Thus, in the existing LCD, images cannot be displayed at the rate of one image within the afterimage allowance time (about 1/50 sec.) of human eyes and therefore, flicker is conspicuous and adversely affects the quality of image. Further, if the LCD is driven by a frequency greater than that used at present, satisfactory contrast will be not obtained, and this also gives rise to the problem that the quality of image is deteriorated.

In the stereoscopic image reproducing apparatus of the aforedescribed conventional art example 2, an image display device using the LCD as described above is sometimes used as means for displaying the displayed image 21. However, when there is constructed a stereoscopic image reproducing apparatus by which parallax images from the five directions of the positions a"–e" as shown in FIGS. 17 and 18 can be observed, it is necessary that the images 21a–21e be displayed at a rate of one image within a time corresponding to 1/5 of man's afterimage allowance time (about 1/5 sec.), i.e., about 1/250 sec. in order that the observer may observe a moving image free of flicker from any of the positions a"–e".

As previously described, in the image display device using the conventional art LCD, it is impossible to display images at such a high speed. So, to construct a stereoscopic image reproducing apparatus by the use of this image display device, a stereoscopic moving image could not be observed unless the unsatisfactory design of reducing the number of divisions of the observing position or allowing the flicker of the image display device is resorted to.

SUMMARY OF THE INVENTION

The present invention has as its object to provide an image display device which uses an LCD as image display means and in which even if an image is changed over at high speed, the contrast of the image is not reduced and flicker is inconspicuous and a high quality of displayed image can be obtained, and a stereoscopic image reproducing apparatus using the same.

To achieve the above object, one form of the image display device of the present invention is characterized by:

a plurality of image display means for displaying a plurality of bits of time-serial image information from image producing means;

shutter means corresponding to the plurality of image display means and transmitting or not transmitting a light beam therethrough;

an imaging optical system for imaging the plurality of bits of time-serial image information on the same area on a common imaging plane; and control means for repeating to bring about a state in which only one of the plurality of shutter means transmits a light beam therethrough for a predetermined time with a predetermined time difference to thereby image the plurality of bits of image information successively on the imaging plane.

The image display means have liquid crystal elements.

The shutter means have ferroelectric liquid crystal elements.

The control means brings respective ones of the bits of image information displayed on the plurality of image display means into one-frame stable state at each predetermined period.

The control means renders the plurality of shutter means effective to transmit for a predetermined time only when the image information displayed on the display surfaces of the image display means corresponding to the shutter means is in one-frame stable state, and ineffective to transmit in the other cases.

The image display device further has a screen having an optical diffusing surface on the common imaging plane.

Another form of the image display device of the present invention is characterized by:

a plurality of image display means for displaying a plurality of bits of image information obtained by one and the same object being image-picked up by the use of image pickup means having a plurality of picture elements with the picture elements deviated from one another by a predetermined pitch, or produced by an image producing process;

shutter means corresponding to the plurality of image display means and transmitting or not transmitting a light beam therethrough;

an imaging optical system for imaging the plurality of bits of image information on the same area on a common imaging plane;

control means for repeating to bring about a state in which only one of the plurality of shutter means transmits a light beam therethrough for a predetermined time with a predetermined time difference to thereby image the plurality of bits of image information on the imaging plane; and moving means for moving the image display means or the imaging optical system in a plane perpendicular to the optical axis of the imaging optical system.

Still another form of the image display device of the present invention is characterized by:

a plurality of image display means for displaying a plurality of bits of image information obtained by one and the same object being image-picked up by the use of image pickup means having a plurality of picture elements with the picture elements deviated from one another by a predetermined pitch, or produced by an image producing process;

shutter means corresponding to the plurality of image display means and transmitting or not transmitting a light beam therethrough;

an imaging optical system for imaging the plurality of bits of image information on the same area on a common imaging plane; and moving means for moving the image display means or the imaging optical system in a plane perpendicular to the optical axis of the imaging optical system.

One form of the stereoscopic image display apparatus of the present invention is characterized by:

a plurality of image display means for displaying a plurality of bits of image information having parallaxes from image producing means;

shutter means corresponding to the plurality of image display means and transmitting or not transmitting a light beam therethrough;

a screen having a diffusing surface;

an imaging optical system for imaging the plurality of bits of image information on the same area on the diffusing surface of the screen;

first imaging means for forming the image on the diffusing surface;

opening control means located at the pupil position of the first imaging means for controlling an opening;

second imaging means for imaging the opening in opening means; and control means for repeating to bring about a state in which only one of the plurality of shutter means transmits a light beam therethrough for a predetermined time with a predetermined time difference to thereby image the plurality of bits of image information successively on the diffusing surface, and varying exit pupil control means in synchronism with the operation of the shutter means.

The image display means have liquid crystal elements.

The shutter means have ferroelectric liquid crystal elements.

The control means brings respective ones of the bits of image information displayed on the plurality of image display means into one-frame stable state at each predetermined period.

The control means renders the plurality of shutter means effective to transmit for a predetermined time only when the image information displayed on the display surfaces of the image display means corresponding to the shutter means is in one-frame stable state, and ineffective to transmit in the other cases.

Some specific embodiments of the present invention will become apparent from the following detailed description thereof.

BRIEF DESCRIPTION OF THE DRAWINGS

FIG. 18 is an illustration of the operation of the stereoscopic image reproducing apparatus according to the conventional art.

FIGS. 19A and 19B are illustrations of the inputting of a parallax image used in the stereoscopic image reproducing apparatus according to the conventional art.

DESCRIPTION OF THE PREFERRED EMBODIMENTS

Figure 1:
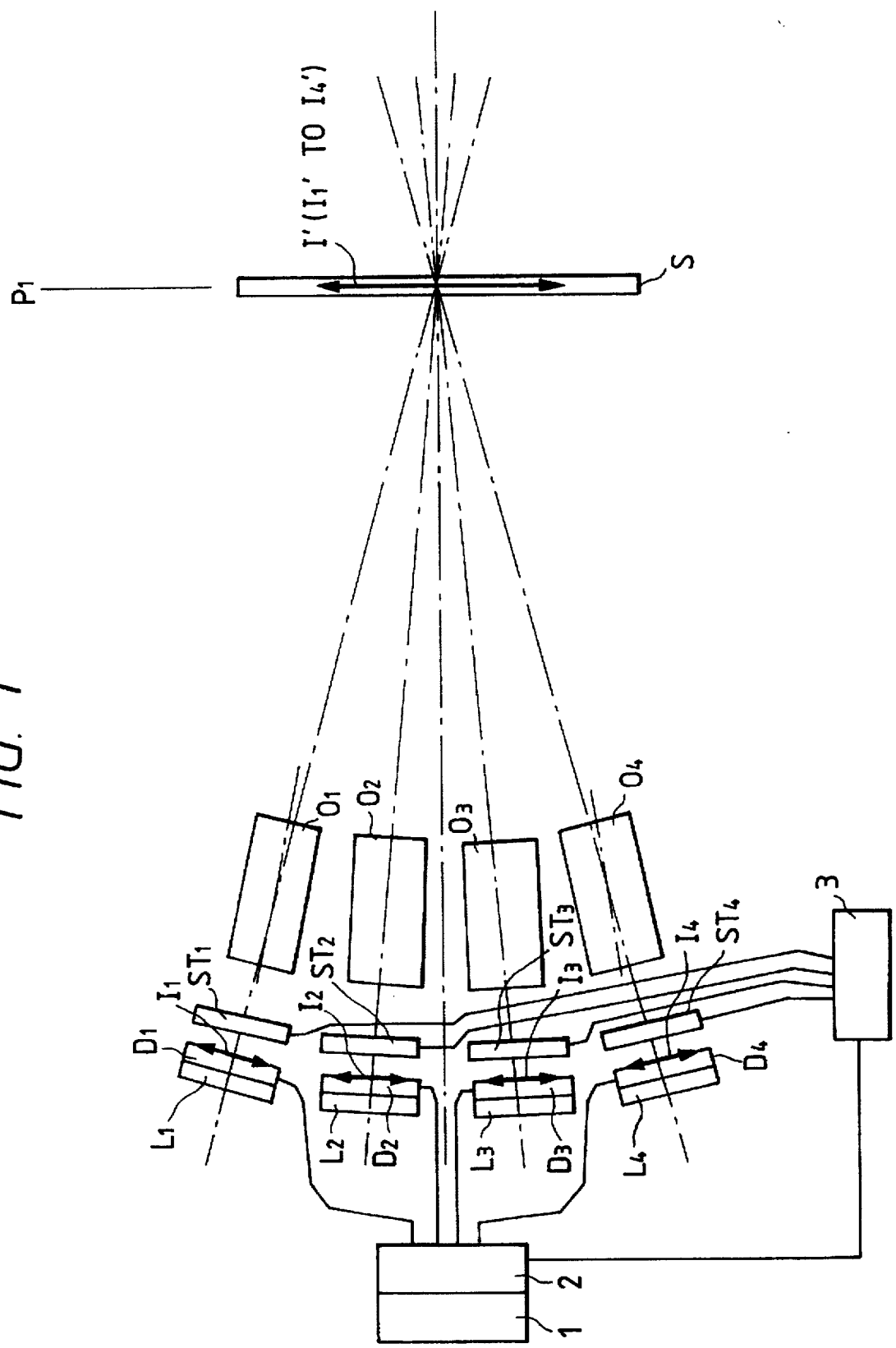
FIG. 1 is a schematic view of the essential portions of Embodiment 1 of the image display device of the present invention.

FIG. 1 is a schematic view of the essential portions of Embodiment 1 of the image display device of the present invention. FIG. 1 is a view of the construction of this embodiment as it is seen vertically from about it. Let it be assumed that the display surface of an image is in a plane perpendicular to the ground. In FIG. 1, the reference characters $D_1$–$D_4$ designate image displays each comprised of a TFT type TN liquid crystal display (liquid crystal device) (hereinafter referred to as LCD). The reference characters $L_1$–$L_4$ denote the back lights of the image displays. The image displays $D_1$–$D_4$ and the back lights $L_1$–$L_4$ each constitute an element of image display means.

The reference numeral 1 designates image producing means comprised, for example, of an image pickup camera for giving the image information of a moving image, VTR and time-serial image information such as the two-dimensional data of an object. The reference numeral 2 denotes a driving portion for the image displays $D_1$–$D_4$, and the reference characters $I_1$–$I_4$ designate images (image information) displayed on the display surfaces of the image displays $D_1$–$D_4$.

The TFT type TN liquid crystal display which is the LCD of the present embodiment has a thin film transistor (TFT) for each picture element, and can hold a voltage for a predetermined time and has a memory property for each picture element. It is driven by the active matrix driving method, and according to this driving method, there is the characteristic that within a response time slightly (1 μsec. or less) longer than the response time of the liquid crystal used, a desired voltage can be applied to all picture elements disposed in the form of a matrix and if a certain time elapses, all the picture elements reach a desired state at a time. This specific driving method will be described later.

The reference characters $ST_1$–$ST_4$ denote shutters (shutter means) which change over to optical on/off (transmitting non-transmitting) state at high speed. The reference numeral 3 designates a switching circuit (first control means) which makes the images $I_1$–$I_4$ displayed on the image display means and the transmitting and non-transmitting states of the shutters $ST_1$–$ST_4$ correlated to each other and selectively controls them. Mechanical shutters can also be used as the shutters $ST_1$–$ST_4$, but in the present embodiment, use is made of shutters comprising ferroelectric liquid crystal elements (hereinafter abbreviated as FLC) of a single-electrode construction. The FLC is a liquid crystal optical element which is very high in response speed, and its response time becomes high up to 50 μsec. if it is restricted to a single-electrode construction. Consequently, if the FLC is used, there can be constructed a high-speed shutter which is driven by an electrical signal alone and operates at 1/10000 sec. or less at highest.

The reference characters $O_1$–$O_4$ denote projection lenses for the images $I_1$–$I_4$. Projection optical systems comprised of the images $I_1$–$I_4$ and the projection lenses $O_1$–$O_4$ form images $I_1'$–$I_4'$ formed by the respective projection optical systems on the diffusing surface of a screen S lying on a plane $P_1$ so that the centers of the images may coincide with one another. That is, they form the images on the same area. The four projection optical systems projecting the images $I_1'$–$I_4'$ differ in optical axis from one another and therefore, each projection optical system is regarded as an eccentric or swing and tilt (shift and rise-fall) optical system, but is optically contrived so that regarding the formation of the images $I_1'$–$I_4'$, they are all formed in the same imaged state. In some cases, there is the possibility of occurrence of distortion or the like which cannot be optically eliminated, but in such cases, the strain of the images is electrically corrected and improved in advance by the image producing means I. The diffusing surface of the screen S will hereinafter be referred to as the common imaging plane, and the images $I_1'$–$I_4'$ will hereinafter be referred to as the displayed images I'.

The imaging plane of the screen S has a diffusing and transmitting characteristic and therefore, an observer at the right of the screen S as viewed in FIG. 1 can observe all of the displayed images I' on the screen S. The screen S may also be a screen of the reflecting and diffusing type, and in that case, the observer observes the displayed images I' from the left of the screen S.

Description will now be made of the action of changing over the images and displaying them in the present embodiment.

In the present embodiment, however, active matrix drives LCD are used as the image displays $D_1$–$D_4$ and the memory property thereof for a predetermined time is utilized and therefore, that point will first be described with reference to FIGS. 2A, 2B and 2C.

Figure 2C:
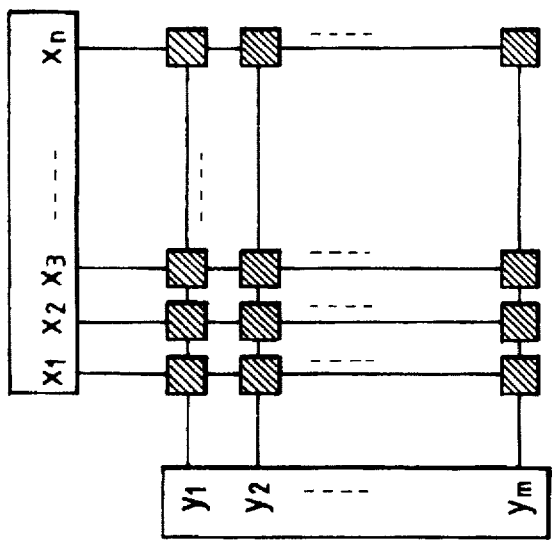
FIGS. 2A, 2B and 2C are illustrations of the active matrix driving of liquid crystal.
Figure 2B:
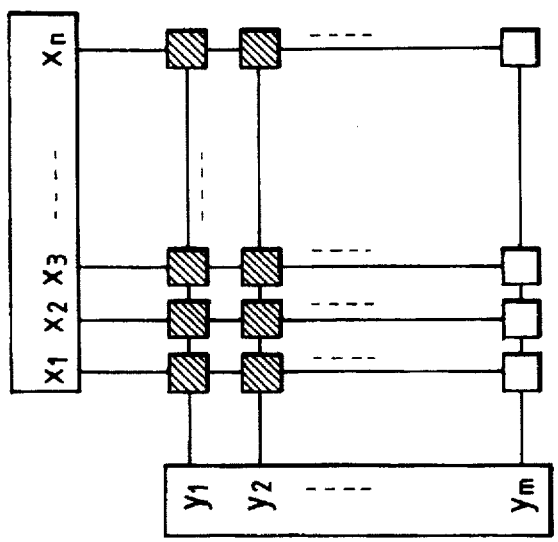
Figure 2A:
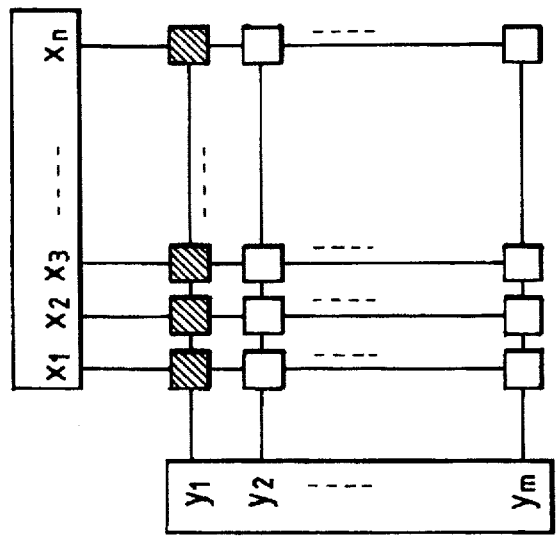

FIGS. 2A, 2B and 2C are illustrations of the active matrix driving method. FIG. 2A shows the state of LCD drive at a time $t_a$, FIG. 2B shows the state of LCD drive at a time $(t_a+\Delta t)$, and FIG. 2C shows the state of LCD drive at a time $(t_a+\Delta t')$.

In the figures, what are indicated by a plurality of squares are electrodes of the respective picture elements, $x_1, x_2, \ldots, x_n$ are data lines for selecting the drive in a horizontal scanning direction, and $y_1, y_2, \ldots, y_n$ are scanning lines for selecting the drive in a vertical scanning direction.

At the time $t_a$ in FIG. 2A, the picture element of all picture elements selected by the scanning line $y_1$ is being driven. (A predetermined driving voltage is being applied to the scanning line $y_1$.) The light transmission output distribution of each picture element in the horizontal direction at this time is determined by the distribution of the voltage applied to the data lines $x_1, x_2, \ldots, x_n$, and the liquid crystal of each picture element begins to response in conformity with the voltage applied thereto. In the figures what depicts the electrodes in white shows a state in which a driving voltage for making the picture elements look white has been applied, and what depicts the electrodes in black shows a state in which a driving voltage for making the picture elements look black has been applied. However, to make the description easily understood, it is to be understood here that such drive that all picture elements in an image field become black is done.

Next, at the time $(t_a+\Delta t)$ in FIG. 2B, the picture element selected by the scanning line $y_2$ is being driven. (A predetermined driving voltage is being applied to the scanning line $y_2$.) Again at this time, the light transmission output distribution of each picture element in the horizontal direction is determined by the distribution of the voltage applied to the data lines $x_1, x_2, \ldots, x_n$. However, the driving voltage applied to the electrode of the picture element selected by the scanning line $y_1$ at the time $t_a$ is held also at the time $(t_a+\Delta t)$ by the memory property of TFT and therefore, at this time, both of the row of the scanning line $y_1$ and the row of the scanning line $y_2$ are driven at a time. However, $\Delta t$ is sufficiently smaller than the response time $\tau$ of the liquid crystal and therefore, the liquid crystal of the picture elements in any row does not yet response sufficiently.

In the same manner, the driving of the picture elements selected by the scanning lines $y_3-y_{m-1}$ is done in succession, and in a state in which at the time $(t_a+\Delta t')$ in FIG. 2C, the picture element selected by the scanning line $y_m$ has been driven, a desired driving voltage is applied to all picture elements in conformity with an image to be displayed, by the memory property of TFT. However, $\Delta t'$ is also sufficiently smaller than the response time $\tau$ of the liquid crystal and therefore, the liquid crystal of the picture element driven at the times $t_a$ to $(t_a+\Delta t')$ does not yet respond sufficiently. For the first time at a time $(t_a+\Delta t'+\tau)$, the display of all picture elements reaches a desired state. Such a state in which at a certain time, all picture elements response sufficiently and all picture elements are completely displayed is herein defined as "one-frame stable state".

In "one-frame stable state", an image is displayed without any defect. It is desirable that such state be held for a certain time, and the holding time can be adjusted by varying the element characteristic of the TFT installed for each picture element and the electrical capacity of the liquid crystal.

In the present embodiment, a plurality of image display means are brought into the above-described "one-frame stable state" with a time difference, whereby there is constructed an image display device capable of changing over and displaying images at a speed as high as about three times the conventional LCD. The action of the device will be described below.

Figure 3:
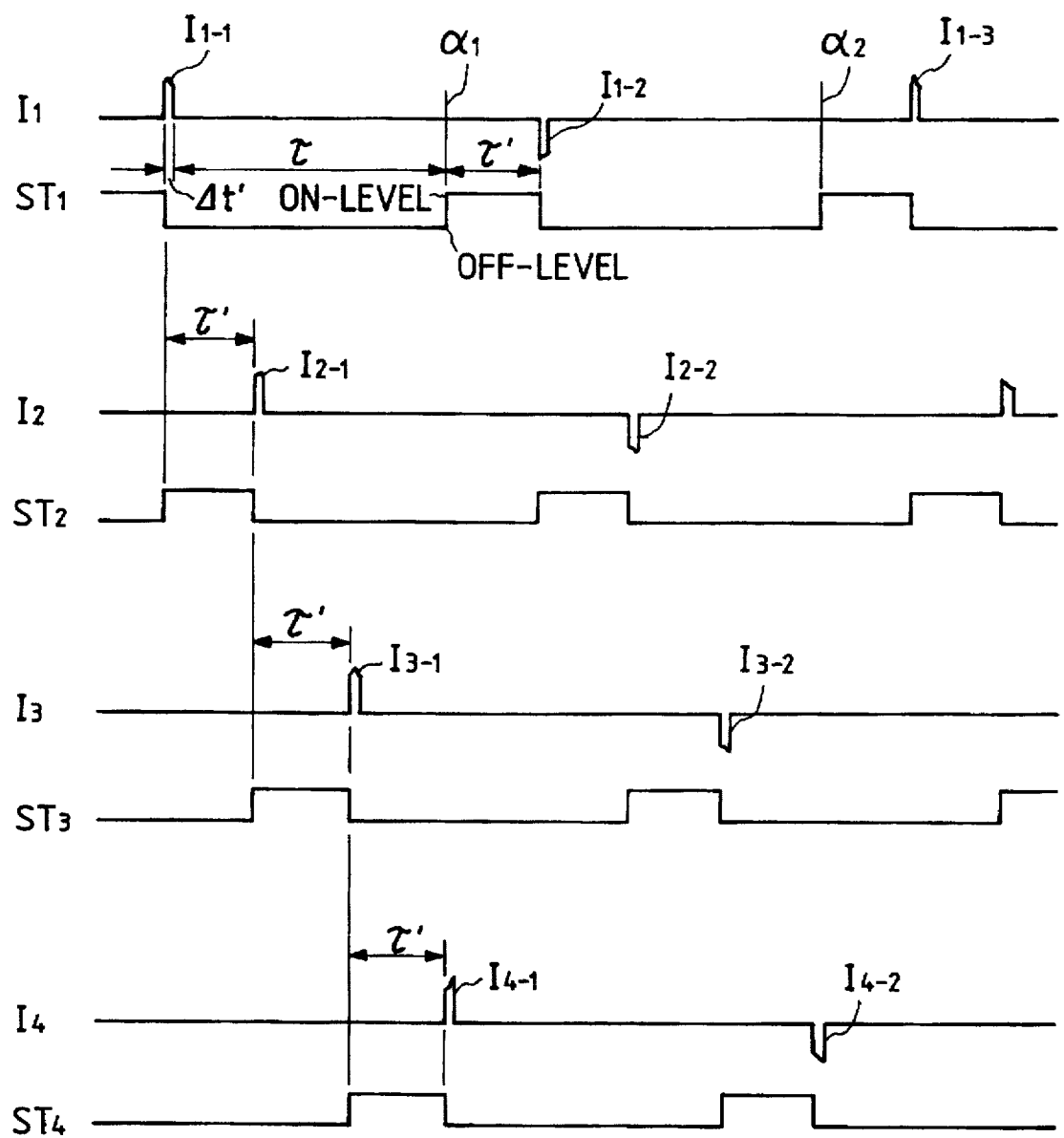
FIG. 3 is an illustration of variations with time in the electrical signal of an image inputted to each display in Embodiment 1 and driving signals for shutters.

FIG. 3 shows variations with time in the electrical signals of the images $I_1-I_4$ inputted to the image displays $D_1-D_4$ in the present embodiment and the driving signals and driving signals for the shutters $ST_1-ST_4$.

The operation of the image $I_1$ and the shutter $ST_1$ will first be described. A signal $I_{1-1}$ in the figure represents all of the image information of one frame of the image $I_{1-1}$ displayed on the image display $D_1$ (all of the scanning of $y_1-y_m$). The time $\Delta t'$ required for the inputting of this signal is very short as compared with the response time $\tau$ of the liquid crystal. When after the inputting of the signal of the image $I_{1-1}$, the response time $\tau$ of the liquid crystal elapses (a position $\alpha_1$ in FIG. 3), the image (image information) $I_{1-1}$ on the image display $D_1$ becomes the aforedescribed "one-frame stable state". The switching circuit 3 controls the shutter $ST_1$ and from this point of time, it renders the shutter $ST_1$ into its transmitting (on) state for a time $\tau'$. So, for this time, the image $I_{1-1}'$ of the image $I_{1-1}$ is projected and formed on the screen S.

When the shutter $ST_1$ is closed and becomes a non-transmitting (off) state, the signal of the image $I_{1-2}$ is then inputted. When after the inputting of this signal, the response time $\tau$ of the liquid crystal elapses (a position $\alpha_2$ in FIG. 3), the image $I_{1-2}$ on the image display $D_1$ becomes "one-frame stable state" and the shutter $ST_1$ is opened, and the image $I_{1-2}'$ of the image $I_{1-2}$ is projected and formed on the screen S.

The image display $D_1$ and the shutter $ST_1$ repeat such an operation at a predetermined period. So, the changeover display period of the image $I_1$ on the image display $D_1$ becomes $(\tau+\tau')$. This is a period during which sufficient image contrast is obtained in a popular LCD.

The action of the image $I_2$ and the shutter $ST_2$ will now be described. The signal of the image $I_{2-1}$ in FIG. 3 is inputted later by a time $\tau'$ than the signal $I_{1-1}$ and therefore, the image $I_{2-1}$ on the image display $D_2$ becomes "one-frame stable state" later by the time $\tau'$ than the image $I_{1-1}$ on the image display $D_1$. Consequently, as soon as the switching circuit 3 closes the shutter $ST_1$, it opens the shutter $ST_2$ and the image $I_{2-1}'$ of the image $I_{2-1}$ is projected and formed on the screen S. Thereafter, as in the case of the image $I_1$ and the shutter $ST_1$, an image signal is repetitively inputted at the period $(\tau+\tau')$.

A similar operation is performed with regard also to the other image displays $D_3$, $D_4$ and the shutters $ST_3$, $ST_4$, and as shown, a signal having a predetermined phase difference $\tau'$ is inputted at the same period, and the image display and the shutter operation are repeated periodically.

As described above, in the present embodiment, a plurality of bits of time-serial image information are displayed with a time difference on the display surfaces of a plurality of image display means, and only the image information in one-frame stable state is imaged on the diffusing surface (common imaging plane) of the screen S with the shutter means corresponding to the pertinent image display means brought into its transmitting state for a predetermined time, and the image information imaged on the diffusing surface is observed. By only one of the plurality of shutters, the state wherein a light beam is transmitted therethrough for a predetermined time is repeated, with a predetermined time difference.

By the above-described operation, the images $I_1'-I_4'$ of the images $I_1-I_4$ displayed on the four image displays $D_1-D_4$ are successively projected onto the screen S. In the conventional art image display device having a single image display, a minimum $\tau$ has been required as the image changeover period, but when the screen S of the present embodiment is regarded as the display surface of a display, the present embodiment can be regarded as a high-speed image display device of an image changeover period $\tau'=\tau/3$.

That is, according to the construction of the present embodiment, the image changeover display speed of the images $I_1'-I_4'$ on the screen S can be made as high as three times the image changeover display speed of the respective LCDs constituting the displays $D_1-D_4$. Further, if in a construction similar to that of the present embodiment, n lines of image displays and projection lenses are prepared, the image changeover display speed of the displayed image I' can be made as high as n times the image changeover display speed of an image display.

In the present embodiment, LCDs are used as the image display means, but since the displayed images I' displayed are always images in "one-frame stable state", a reduction in image contrast and flicker during the reproduction of a moving image are scarcely seen.

In the present embodiment, TFT type LCDs are used as the means for displaying the images $I_1-I_4$, but any other image displays capable of creating "one-frame stable state" can be used as the image displays $D_1-D_4$ of the present invention. For example, some of the aforedescribed ferroelectric liquid crystal elements (FLC) have a memory property of optical rotation state. If FLCs of this kind are disposed in the form of a matrix and used as image displays and active matrix driving is effected, "one-frame stable state" will be created and therefore, they can replace the above-described TFT type TN liquid crystal displays.

The present invention achieves an image display device capable of changing over images at high speed by the use of a plurality of image displays, by utilizing the fact that in TFT type LCDs, "one-frame stable state" can be obtained at a predetermined period by the contrivance of the image signal inputted.

Figure 4:
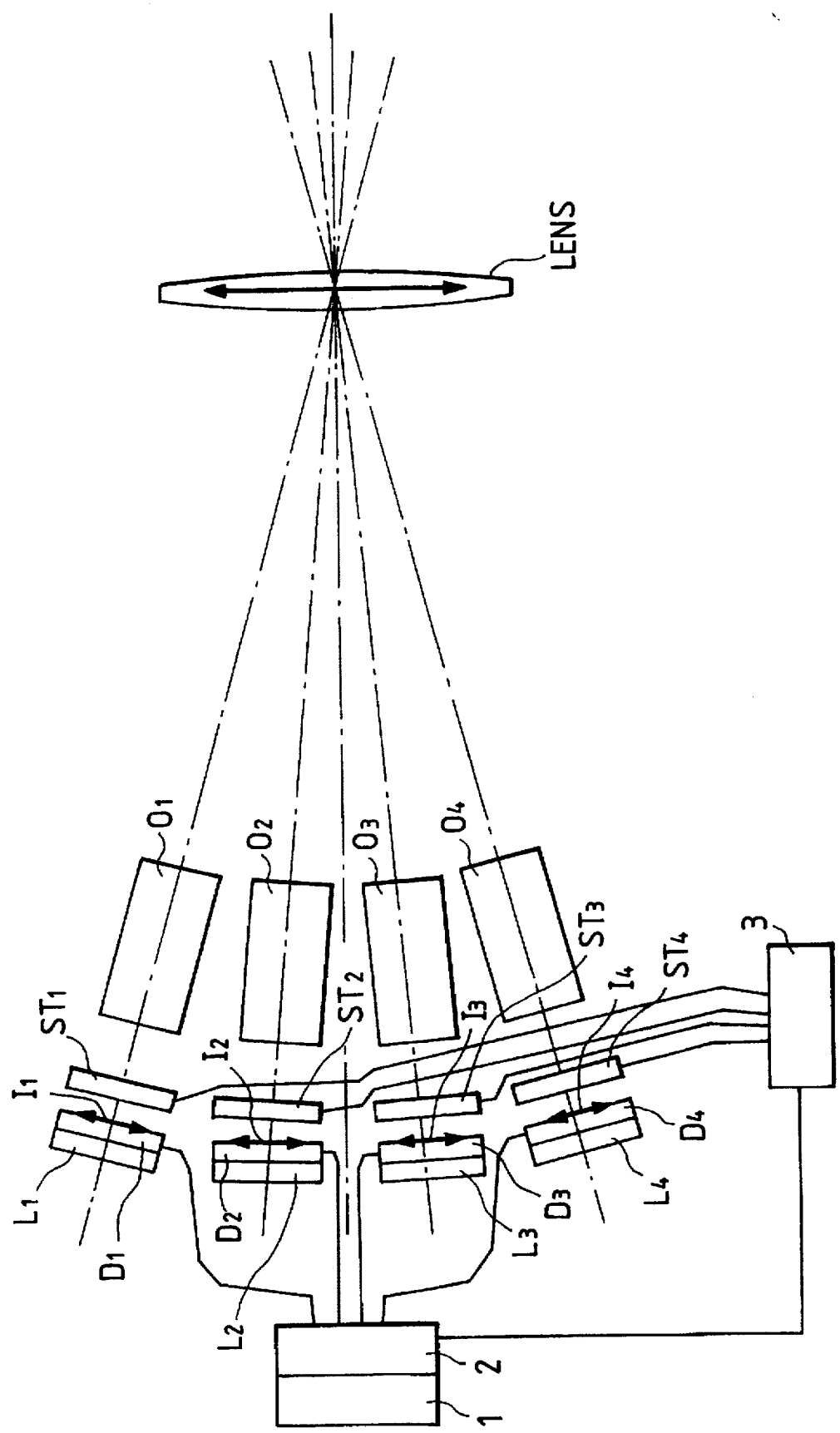
FIG. 4 shows a derivative example of Embodiment 1.
Figure 5:
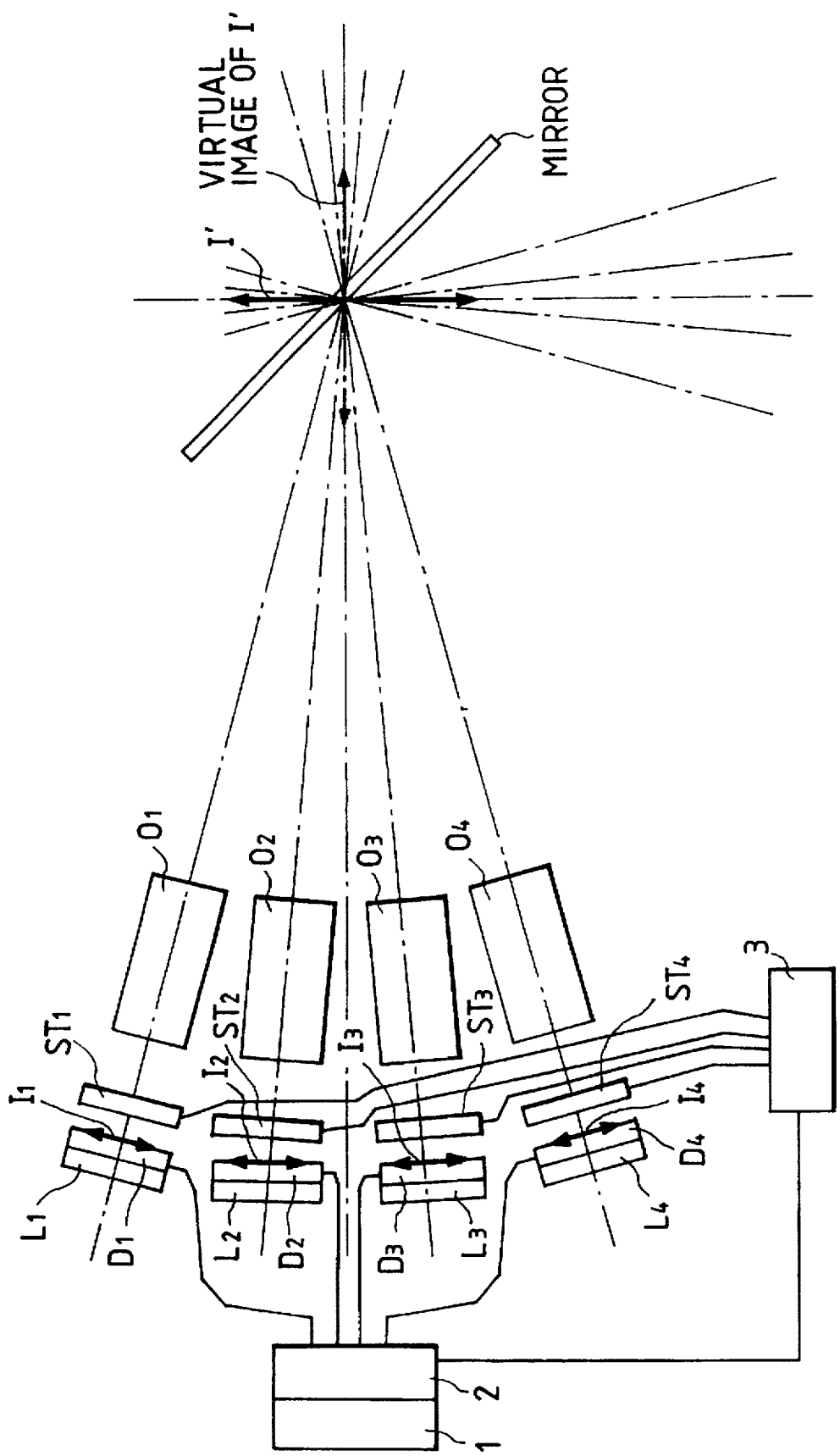
FIG. 5 shows a derivative example of Embodiment 1.

Also, if the observation area by the image observer is restricted, the screen S which is an image display surface can be replaced by an optical element such as a lens or a mirror. FIGS. 4 and 5 show derivative examples of Embodiment 1, and are embodiments in which a lens or a mirror is disposed at the position of the screen S in Embodiment 1. On the contrary to the case of the screen, there is not the diffusion of the imaging light and therefore, the observable area becomes narrow or the observation of the marginal portion of the image becomes difficult, but if the image observation area by the observer is restricted, a brighter image can be observed than when the screen S is used.

Figure 6:
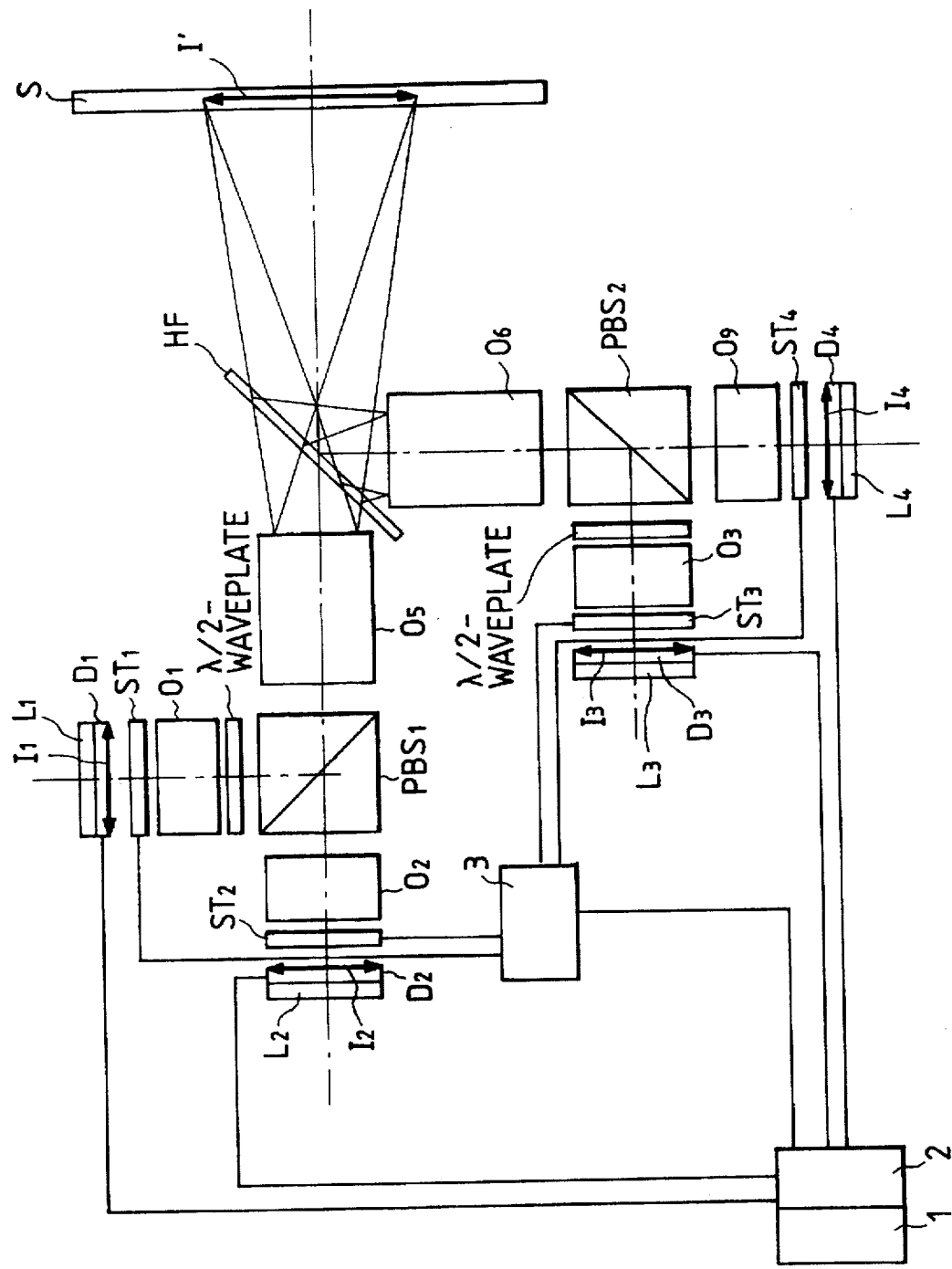
FIG. 6 is a schematic view of the essential portions of Embodiment 2 of the image display device of the present invention.

FIG. 6 is a schematic view of the essential portions of Embodiment 2 of the image display device of the present invention. This figure is a view of the construction of the present embodiment as it is seen vertically from above it. However, it is assumed that the display surface for the image is in a plane perpendicular to the ground. In FIG. 6, elements functionally similar to those in Embodiment 1 are given reference characters similar to those in Embodiment 1. The difference of the present embodiment from Embodiment 1 is that in the present embodiment, all of the image displays $D_1-D_4$ and first projection lenses $O_1-O_4$ are optically set on the same axis.

The image displays $D_1-D_4$, the back lights $L_1-L_4$ and the shutters $ST_1-ST_4$ are the same as those in Embodiment 1. The first projection lenses $O_1-O_4$ are disposed in front of the respective image displays $D_1-D_4$, but the optical axes of the first projection lenses $O_1$ and $O_2$ are combined into one by the joint surface of a polarizing beam splitter PBS1, and the optical axes of the first projection lenses $O_3$ and $O_4$ are combined into one by the joint surface of a polarizing beam splitter PBS2.

Design is made such that light beams from the images $I_1-I_4$ displayed on the display surfaces of the image displays $D_1-D_4$ have their directions of polarization combined by the polarizing beam splitters PBS1 and PBS2, respectively. When for example, the light beams from the respective images are all P-polarized light, if a λ/2-waveplate is disposed in the optical path of the first projection lenses $O_1$ and $O_3$ and P→S polarization conversion is effected and the polarizing beam splitters PBS1 and PBS2 are disposed in the directions shown in FIG. 6, the light beams from the respective images can be efficiently combined together. The image displays $D_1-D_4$ and the back lights $L_1-L_4$ each constitute an element of the image display means.

Second projection lenses $O_5$ and $O_6$ equal in construction to each other are disposed on two optical axes coincident with each other. Further, the optical axis of the first projection lens $O_2$ and the optical axis of the first projection lens $O_4$ are made optically coincident with each other by a half mirror HF and therefore, the four image display means are substantially on the same optical axis relative to the screen S. Also, the distances from the screen S to the four image display means are all optically equal to one another, and the constructions of the optical systems to the respective image display means are equal to one another and therefore, it can be said that to the screen S, the four image display means are optically at the same position. Thus, the images $I_1-I_4$ on the image displays $D_1-D_4$ are all imaged as displayed images I' (=$I_1'-I_4'$) on the screen S by the respective optical systems. The first projection lenses $O_1$ and $O_2$, with the second projection lens $O_5$, constitute an element of the projection lenses for the images $I_1$ and $I_2$, and the first projection lenses $O_3$ and $O_4$, with the second projection lens $O_6$, constitute an element of the projection lenses for the images $I_3$ and $I_4$.

If in the present embodiment of the above-described construction, the display of the images and the sequence of the opening and closing of the shutters are effected as in Embodiment 1, an effect similar to the effect of Embodiment 1 can be obtained.

According to the present embodiment, however, the same coaxial optical systems are used as all of the first projection lenses $O_1-O_4$ and therefore, considerations to the individual differences among the optical systems, the aberration characteristics thereof, etc. may be small as compared with Embodiment 1.

Figure 7:
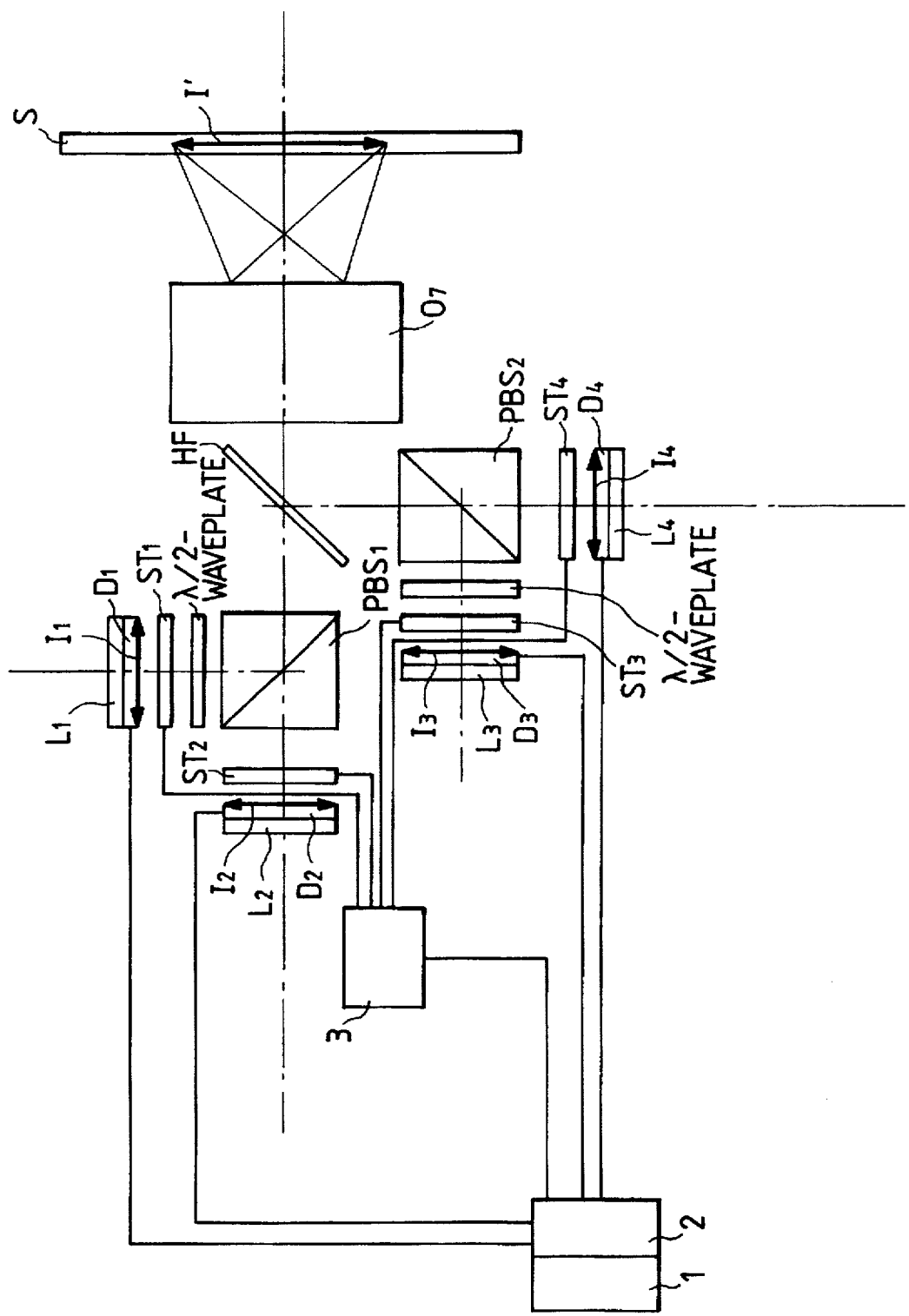
FIG. 7 shows a derivative example of Embodiment 2.

Further, the number of parts of the projection optical systems can be decreased by making the optical axes thereof common. If as shown, for example, in FIG. 7, a projection lens $O_7$ is disposed after the optical axes are finally combined into one, only one projection lens will be required as compared with the construction of FIG. 6, and a further reduction in cost and higher accuracy can be achieved.

Figure 8:
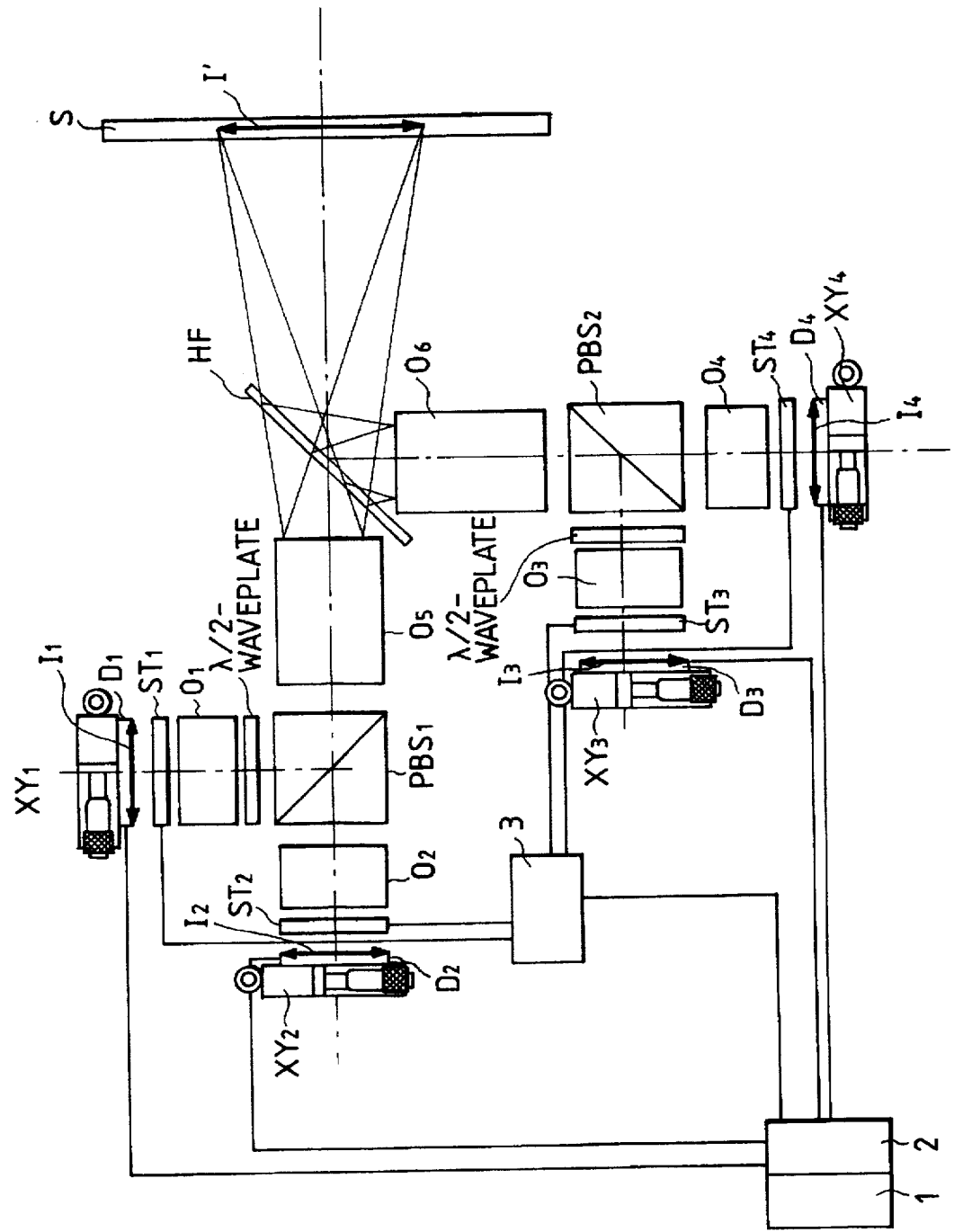
FIG. 8 is a schematic view of the essential portions of Embodiment 3 of the image display device of the present invention.
Figure 9A:
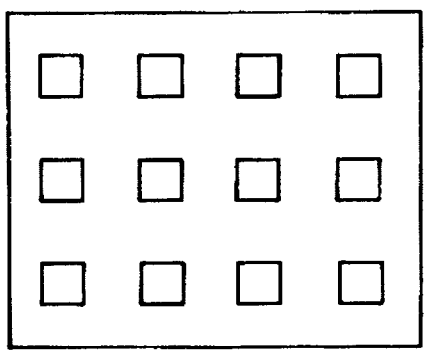
FIGS. 9A, 9B, 9C and 9D are illustrations of the states of the picture elements of displayed images in Embodiment 3.
Figure 9B:
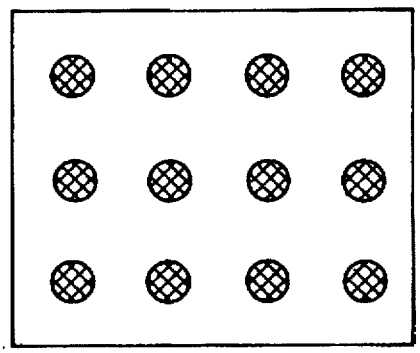
Figure 9C:
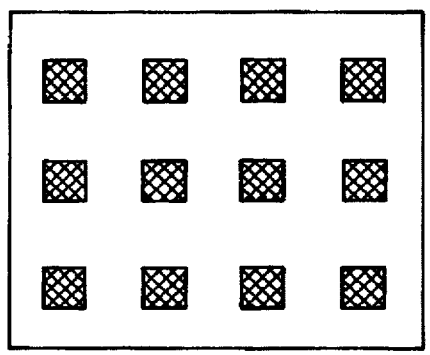
Figure 9D:
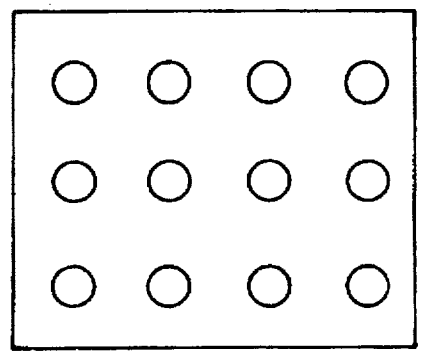

FIG. 8 is a schematic view of the essential portions of Embodiment 3 of the image display device of the present invention. The main object of the image display device of the present invention is to make the image changeover display speed higher, and this embodiment achieves an improved quality of image by a similar construction. That is, in the present embodiment, the picture elements of the displayed images are interpolated with one another by a plurality of displays to thereby realize an improved quality of image.

The difference of the present embodiment from Embodiment 2 is that XY fine movement stages are provided on the image displays $D_1-D_4$, respectively, so that the display surfaces for the images can be finely moved. In FIG. 8, the reference characters $XY_1-XY_4$ designate XY fine movement stages (moving means) which move the image displays $D_1-D_4$ in directions X and Y in a display plane perpendicular to the optical axes of the respective first projection lenses, whereby the positions of the display surfaces of the image displays $D_1-D_4$ can be finely changed in planes perpendicular to the optical axes of the first projection lenses $O_1-O_4$ and thus, it becomes possible to finely move the relative positional relations among the displayed images I' (=$I_1'-I_4'$) of the images $I_1-I_4$ on the image displays $D_1-D_4$ formed on the screen S, and higher accuracy by the interpolation among the picture elements can be realized.

Figure 10:
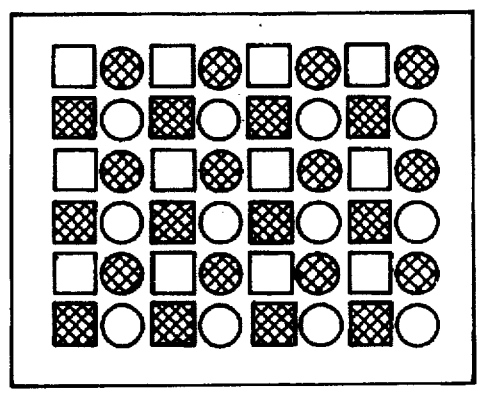
FIG. 10 is an illustration of a state in which the picture elements of four displayed images in Embodiment 3 are combined together.

FIGS. 9A, 9B, 9C and 9D are illustrations showing on an enlarged scale the states of the images $I_1'-I_4'$ of the images $I_1-I_4$ formed on the screen S. There is a gap between the adjacent picture elements of each image, and that portion does not contribute to the display of the image. FIG. 10 shows a state in which in the present embodiment, the images $I_1'-I_4'$ are formed on the screen S while being superposed one upon another. The gap between the picture elements of each image $I_1'-I_4'$ is filled with the picture elements thereof to thereby substantially achieve the minuteness of the picture elements.

The present embodiment displays an effect similar to that of making the numerical aperture of the image displays high when as the image displays, use is made of LCDs which are low in numerical aperture and in which the area of each picture element is liable to become small.

In this case, when one and the same object is to be photographed as the images $I_1$-$I_4$ by the use of four image pickup means, if the picture elements of an image pickup element in each image pickup means are set while being deviated by a predetermined pitch relative to one another and the four images (image information) $I_1$-$I_4$ picked up by such image pickup means are displayed, a great effect will be brought to an improvement in the resolution of the images.

However, without the use of the image pickup means, a picture element deviating process similar to that described above may be carried out by the use of a computer or the like and the four images $I_1$-$I_4$ may be artificially produced by an image producing process and used.

Again in this embodiment, as in Embodiment 1, the display timing of the image displayed on each of the image displays $D_1$-$D_4$ is deviated and therefore, flicker can be remarkably decreased. Thus, in the present embodiment, an improvement in numerical aperture and an improvement in resolution can be achieved at a time or discretely from each other by the utilization of the heightening of the image changeover display speed which is the main object of the present invention.

While in the present embodiment, the image displays $D_1$-$D_4$ are moved by the XY fine movement stages, the image displays $D_1$-$D_4$ can be fixed and XY fine movement stages can be installed on the first projection lenses $O_1$-$O_4$ so that the first projection lenses may be finely moved in a plane perpendicular to the optical axes of the projection lenses to thereby fill the gaps among the picture elements of the images $I_1'$-$I_4'$ with the picture elements and achieve substantially the minuteness of the picture elements.

If in the present embodiment, the object thereof is restricted to the improvement in quality of image by the deviation of the picture elements, image display can be effected while the four shutters $ST_1$-$ST_4$ are kept open or by a construction in which the shutters $ST_1$-$ST_4$ are omitted, thereby achieving two effects, i.e., an improvement in quality of image and an improvement in luminance of image.

Figure 11:
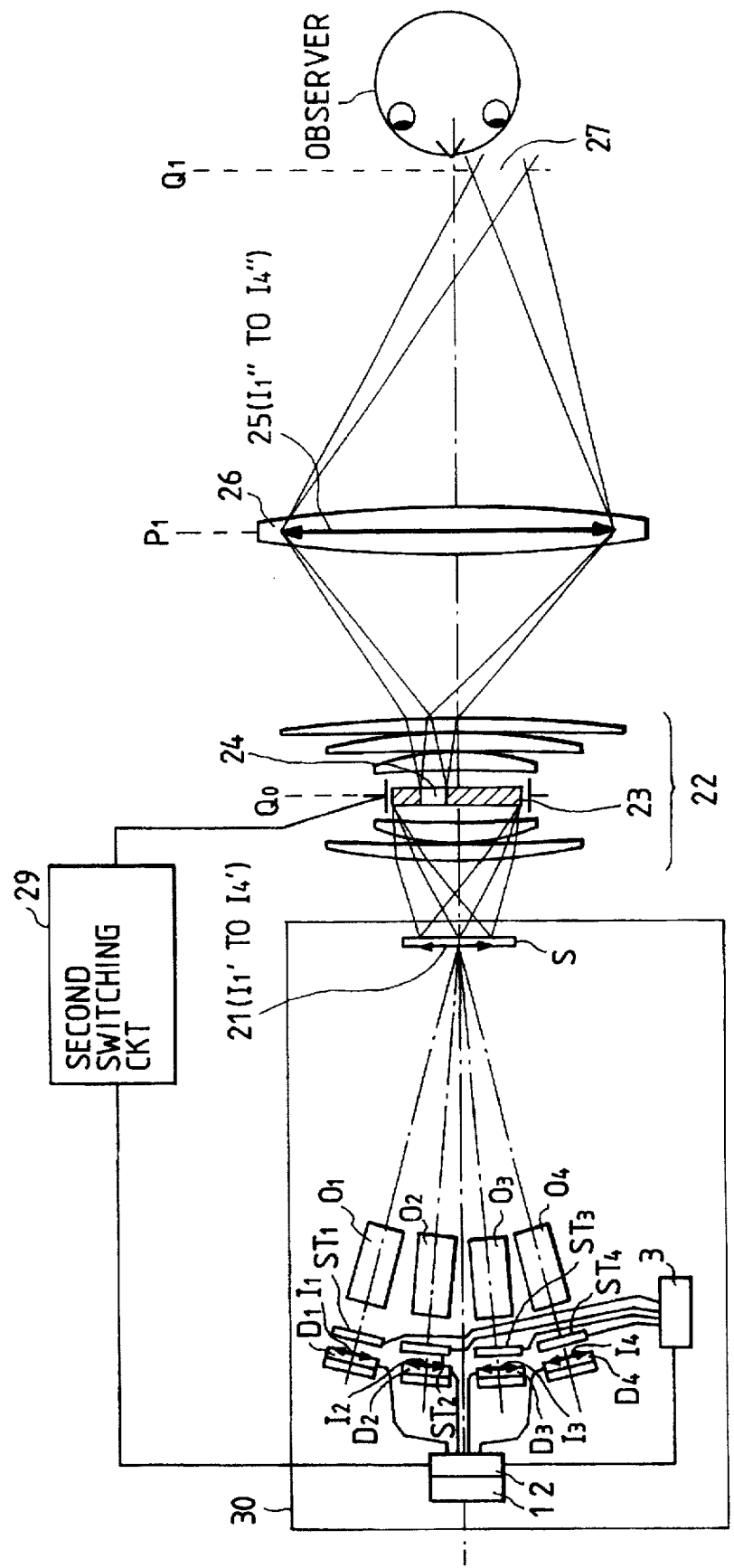
FIG. 11 is a schematic view of the essential portions of an embodiment of the stereoscopic image reproducing apparatus of the present invention.

FIG. 11 is a schematic view of the essential portions of an embodiment of the stereoscopic image reproducing apparatus of the present invention. This embodiment is a stereoscopic image reproducing apparatus having a great number of divisions of the observation position and capable of obtaining sufficient image contrast which is constructed by the use of the two-dimensional image display device of Embodiment 1 or 2 which is high in speed and capable of doing image changeover display.

In FIG. 11, the reference numeral 30 designates an image display device which is comprised of the image display device of Embodiment 1. Image producing means 1 in the image display device 30 is comprised, for example, of multichannel VTR providing the image information of many parallax images, a multichannel image pickup device having a multichannel camera, or image information having a parallax such as the three-dimensional data of an object. These images and three-dimensional data are called image information having a parallax. The multichannel VTR, the multichannel image pickup device or the like has a plurality of images, and from among these images, a parallax image (an image having a parallax) to be displayed is selected and therefore, these images are called original parallax images.

The reference numeral 21 denotes a displayed image displayed on the diffusing surface (common imaging plane) of the screen S of the image display device 30. The reference numeral 22 designates a projection lens (first imaging means) which enlarges the displayed image 21 and forms an enlarged image 25 on a plane $P_1$. The reference numeral 23 denotes a light valve (exit pupil control means) which is installed at an aperture position (plane $Q_0$) corresponding to the optical pupil position of the projection lens 22, mechanically or electrically produces a light transmitting portion and a light intercepting portion, and varies the area of the light transmitting portion (aperture) 24 with time. The reference numeral 29 designates a second switching circuit (second control means) which controls the light valve 23 in synchronism with the images $I_1$-$I_4$ displayed on the displays $D_1$-$D_4$ in the image display device 30 and the operation of the shutters $ST_1$-$ST_4$.

The reference numeral 26 denotes a large convex lens (second imaging means) which is installed so that the principal plane thereof may lie at the position of the plane $P_1$ on which the enlarged image 25 is formed, and forms the image 27 of the aperture 24 in the light valve 23 as a real image on a plane $Q_1$ (second imaging plane) in the space in which the observer is.

The action of the present embodiment will now be described. The images $I_1$-$I_4$ displayed in a predetermined sequence on the image displays $D_1$-$D_4$ form images $I_1'$-$I_4'$ on the diffusing surface of the screen S by the projection lenses $O_1$-$O_4$ through the shutters $ST_1$-$ST_4$. These images $I_1'$-$I_4'$ are called displayed images 21.

The displayed images 21 (=images $I_1'$-$I_4'$) displayed on the screen S of the image display device 30 are enlarged by the projection lens 22 and form enlarged images $I_1''$-$I_4''$ on the principal plane $P_1$ of the large convex lens 26. The enlarged images $I_1''$-$I_4''$ are called enlarged 25. At this time, the area of the aperture 24 in the light valve 23 varies with time. At a certain moment, the paths of light beams forming the enlarged images 25, as shown, are restricted to only some of the light beams entering the projection lens 22.

That is, the large convex lens 26, with the aperture 24 in the plane $Q_0$ as the entrance pupil, forms the image thereof on the plane $Q_1$ and forms the exit pupil 27.

Consequently, in this case, all the light beams which have contributed to the formation of the enlarged images 25 pass through the exit pupil 27, and if the large convex lens 26 is looked at with the eyes placed at the position of the exit pupil 27, the then enlarged images 25 can be observed without "eclipse".

Now, the image display device 30 is of the construction of the aforedescribed Embodiment 1 and can therefore change over and display the images at a speed as high as four times that of the conventional art LCD. Consequently, in the present embodiment, the changeover display of three images can be effected before with the operation of the light valve 23, the exit pupil 27 moves laterally from a certain position and returns to its original position, and as a result, the observation position can be divided into three directions.

Figure 12:
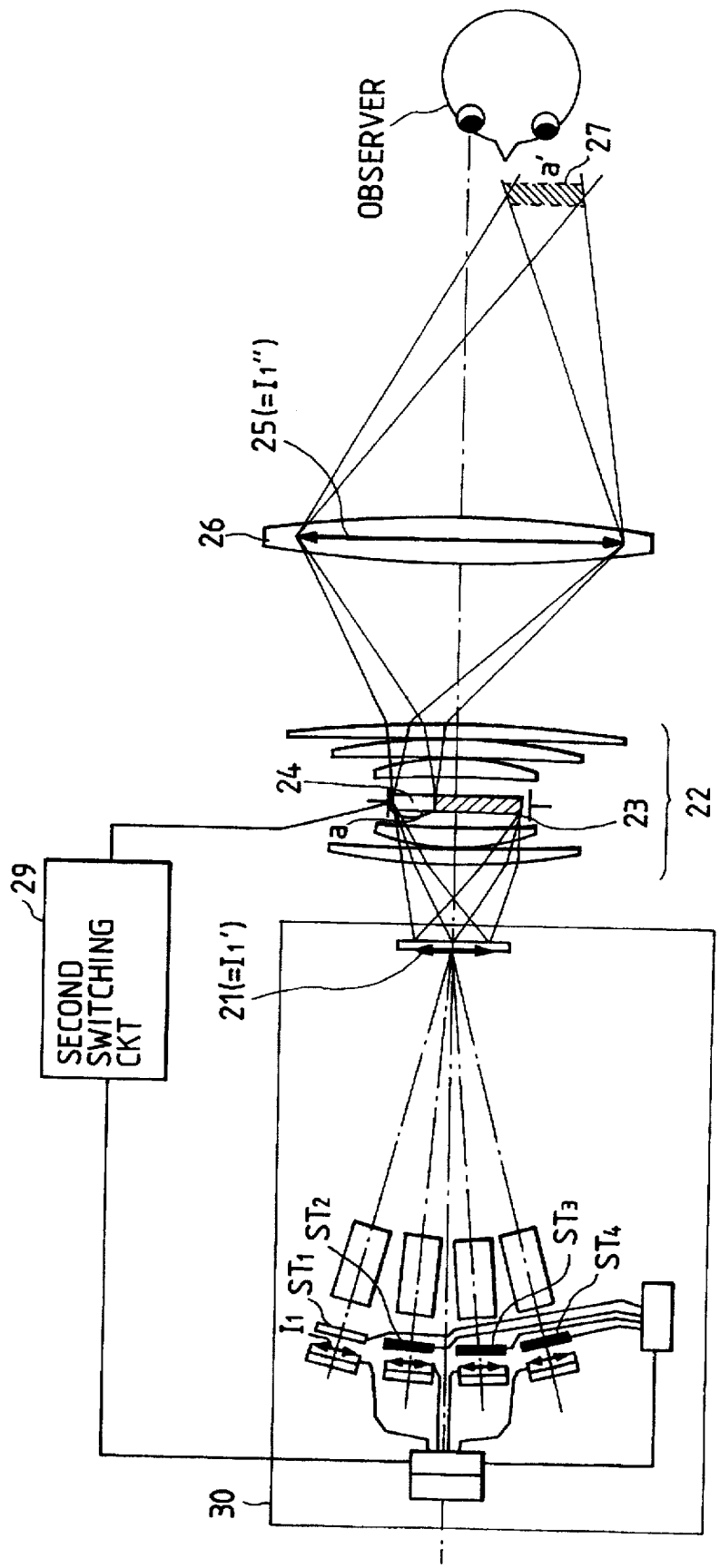
FIG. 12 is an illustration of the operation of the embodiment of the stereoscopic image reproducing apparatus of the present invention.

FIGS. 12 to 15 are illustrations of the operation of the present embodiment. FIG. 12 is an illustration of a case where the image $I_1$ is displayed as being in "one-frame stable state". At this time, an image picked up by a parallax image input camera lying, for example at a position a" in FIGS. 19A and 19B is displayed as the image $I_1$ displayed on the image display $D_1$. At this time, the shutter $ST_1$ is in its transmitting (on) state and the shutters $ST_1$-$ST_4$ are in their non-transmitting (off) state. The second switching circuit 29 controls the light valve 23 and forms the aperture 24 at a position a. So, the exit pupil 27 is formed within the range of an observation area a' indicated by hatching in FIG. 12. Therefore, if the observer's eyes are within the range of the observation area a', the observer can observe the enlarged image 25 (=I$_1$") on the large convex lens 26. The time for which the shutter ST$_1$ is in its transmitting state is τ', which is ⅓ of the response time τ of the conventional art LCD.

Figure 13:
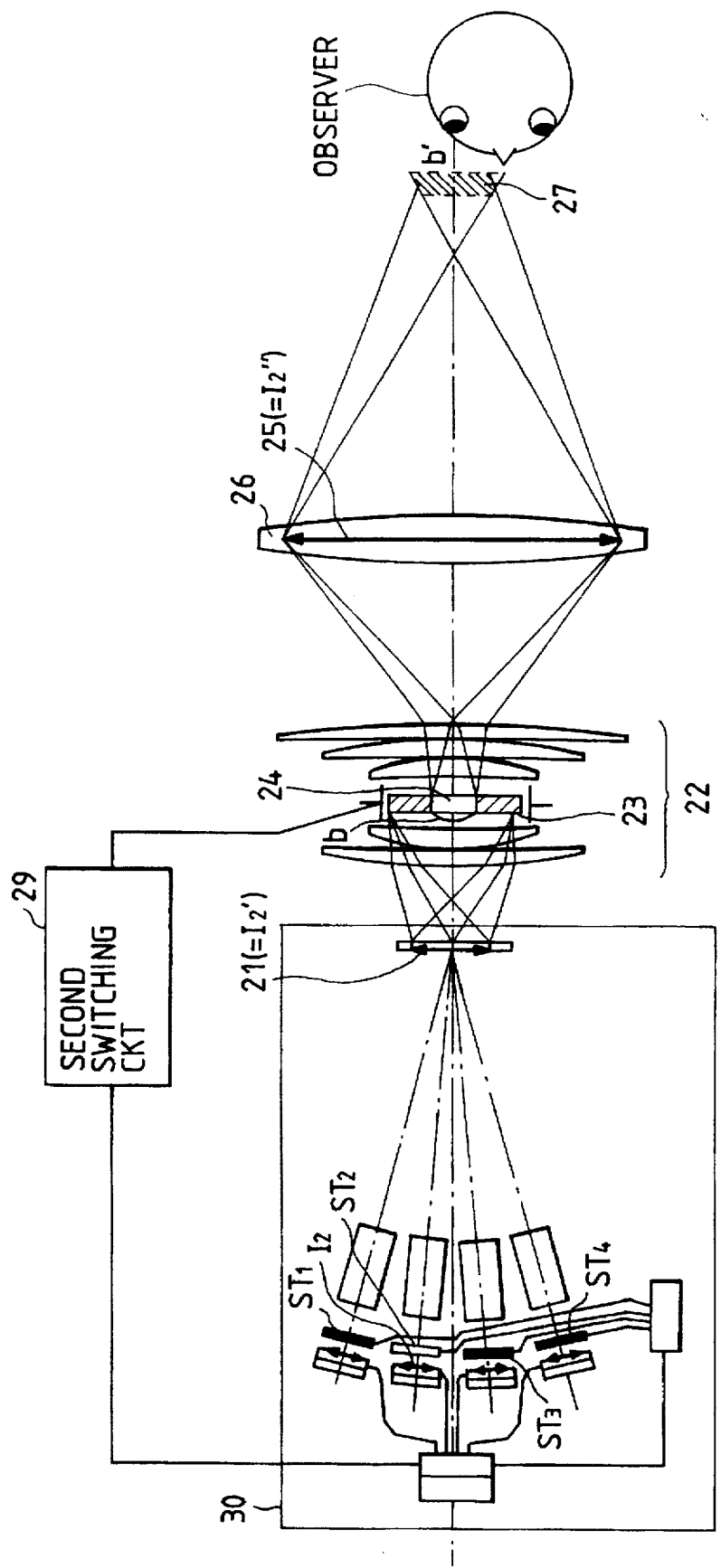
FIG. 13 is an illustration of the operation of the embodiment of the stereoscopic image reproducing apparatus of the present invention.

Next, FIG. 13 is an illustration of a case where the image I$_2$ is displayed as being in "one-frame stable state". At this time, an image picked up by the parallax image input camera lying, for example, at a position b" in FIGS. 19A and 19B is displayed as the image I$_2$ displayed on the image display D$_2$. At this time, the shutter ST$_2$ is in its transmitting (on) state and the shutters ST$_1$, ST$_3$ and ST$_4$ are in their non-transmitting (off) state. The second switching circuit 29 controls the light valve 23 and forms the aperture 24 at a position b. So, the exit pupil 27 is formed within the range of an observation area b' indicated by hatching in FIG. 13. Therefore, if the observer's eyes are within the range of the observation area b', the observer can observe the enlarged image 25 (=I$_2$") on the large convex lens 26. The time for which the shutter ST$_2$ is in its transmitting state is τ', which is ⅓ of the response time τ of the conventional art LCD.

Figure 14:
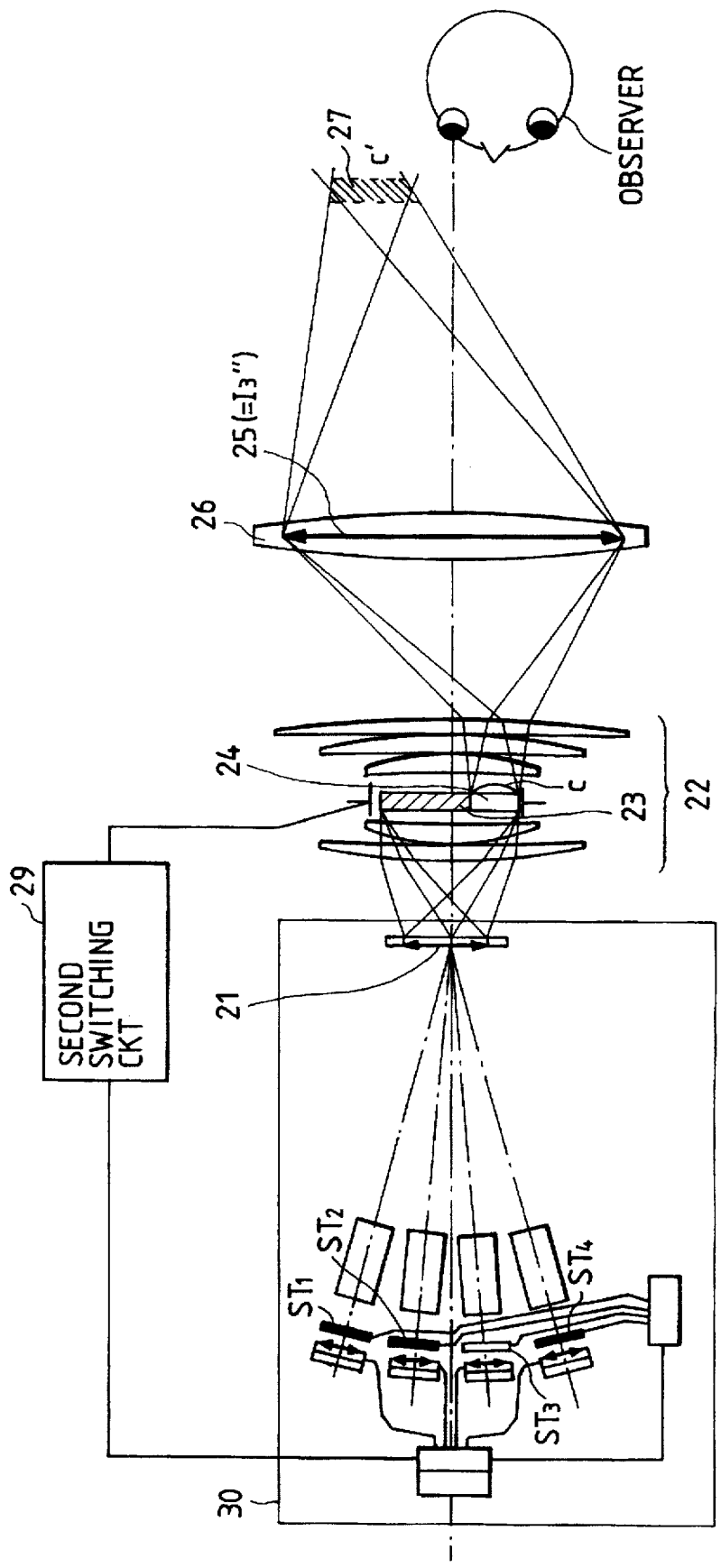
FIG. 14 is an illustration of the operation of the embodiment of the stereoscopic image reproducing apparatus of the present invention.

Next, FIG. 14 is an illustration of a case where the image I$_3$ is displayed as being in "one-frame stable state". At is time, an image picked up by the parallax image input camera lying for example, at a position c" in FIGS. 19A and 19B is displayed as the image I$_3$ displayed on the image display D$_3$. At this time, the shutter ST$_3$ is in its transmitting (on) state and the shutters ST$_4$, ST$_1$ and ST$_2$ are in their non-transmitting (off) state. The second switching circuit 29 controls the light valve 23 and forms the aperture 24 at a position c. So, the exit pupil 27 is formed within the range of an observation area c' indicated by hatching in FIG. 14. Therefore, if the observer's eyes are within the range of the observation area c', the observer can observe the enlarged image 25 (=I$_3$''') on the large convex lens 26. The time for which the shutter ST$_3$ is in its transmitting state is τ', which is ⅓ of the response time τ of the conventional art LCD.

Figure 15:
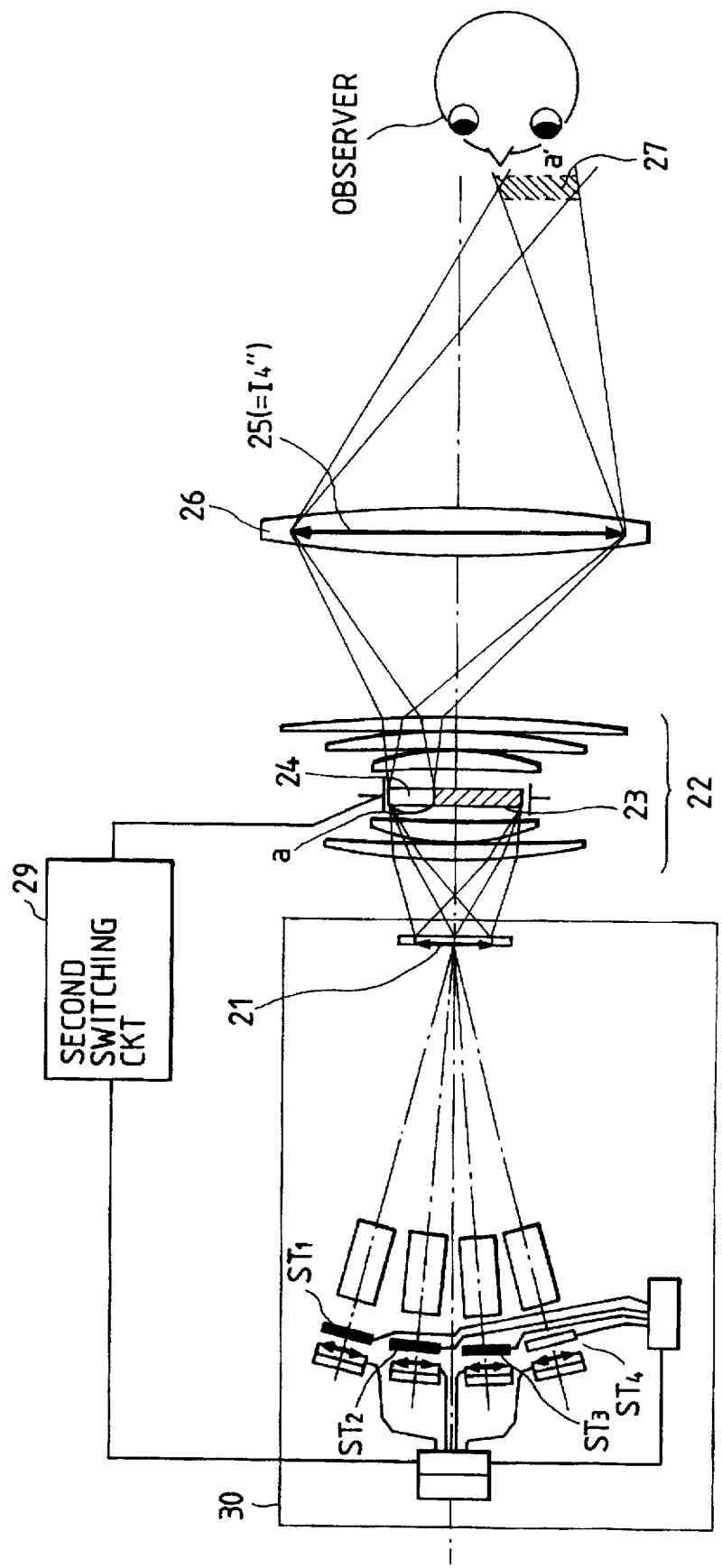
FIG. 15 is an illustration of the operation of the embodiment of the stereoscopic image reproducing apparatus of the present invention.
Figure 16:
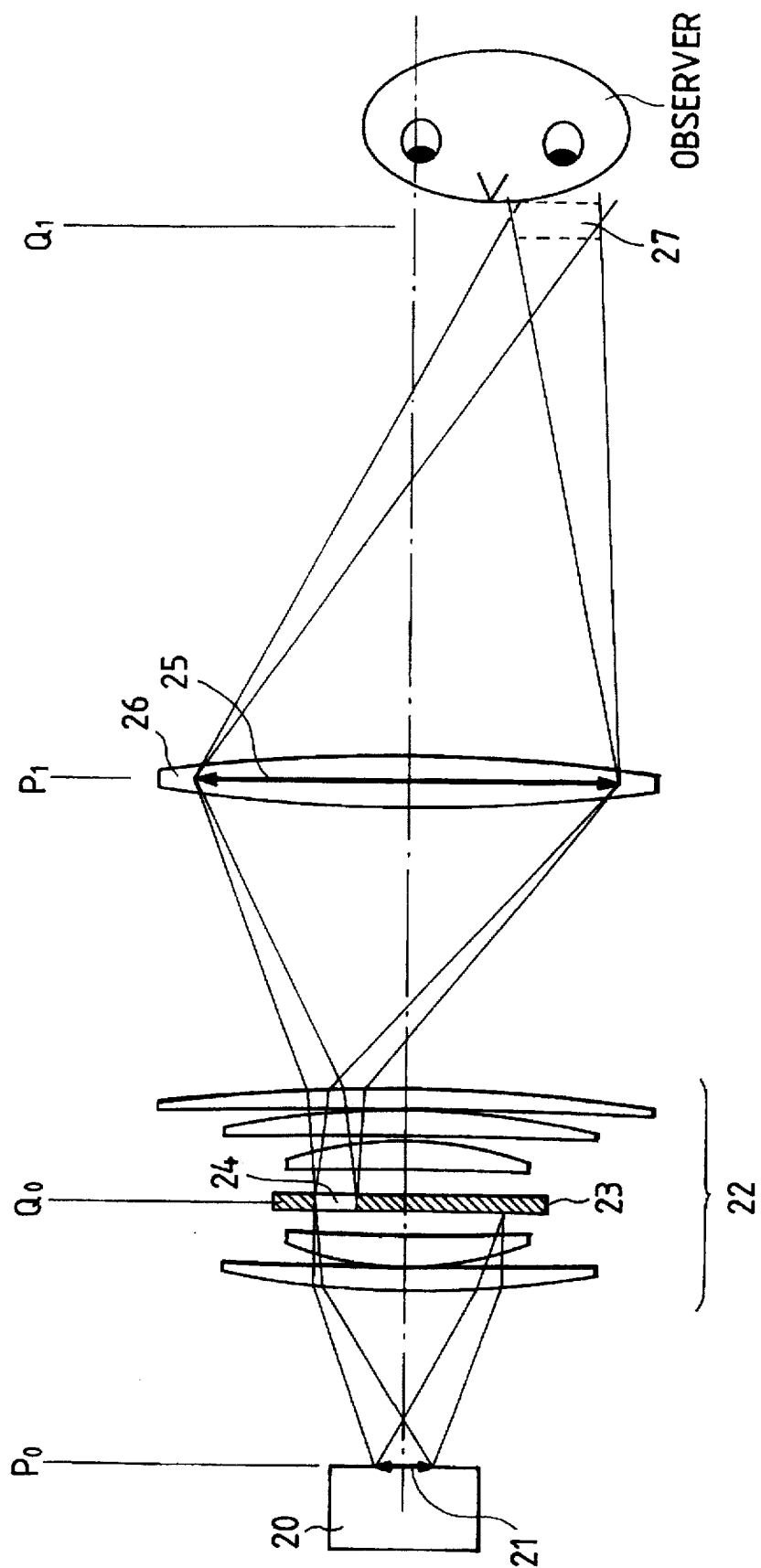
FIG. 16 is an illustration of the principle of a stereoscopic image reproducing apparatus according to the conventional art.
Figure 17:
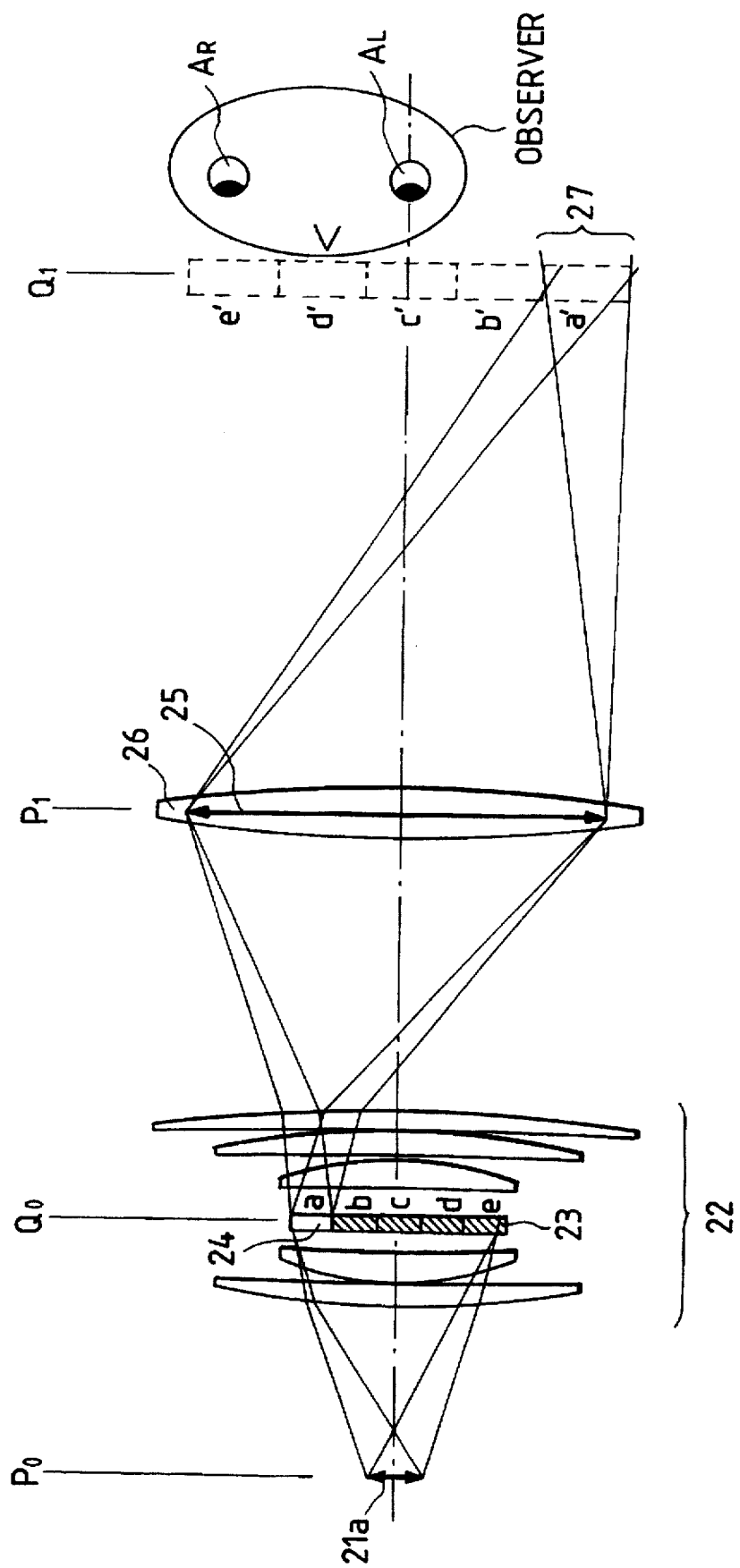
FIG. 17 is an illustration of the operation of the stereoscopic image reproducing apparatus according to the conventional art.
Figure 20:
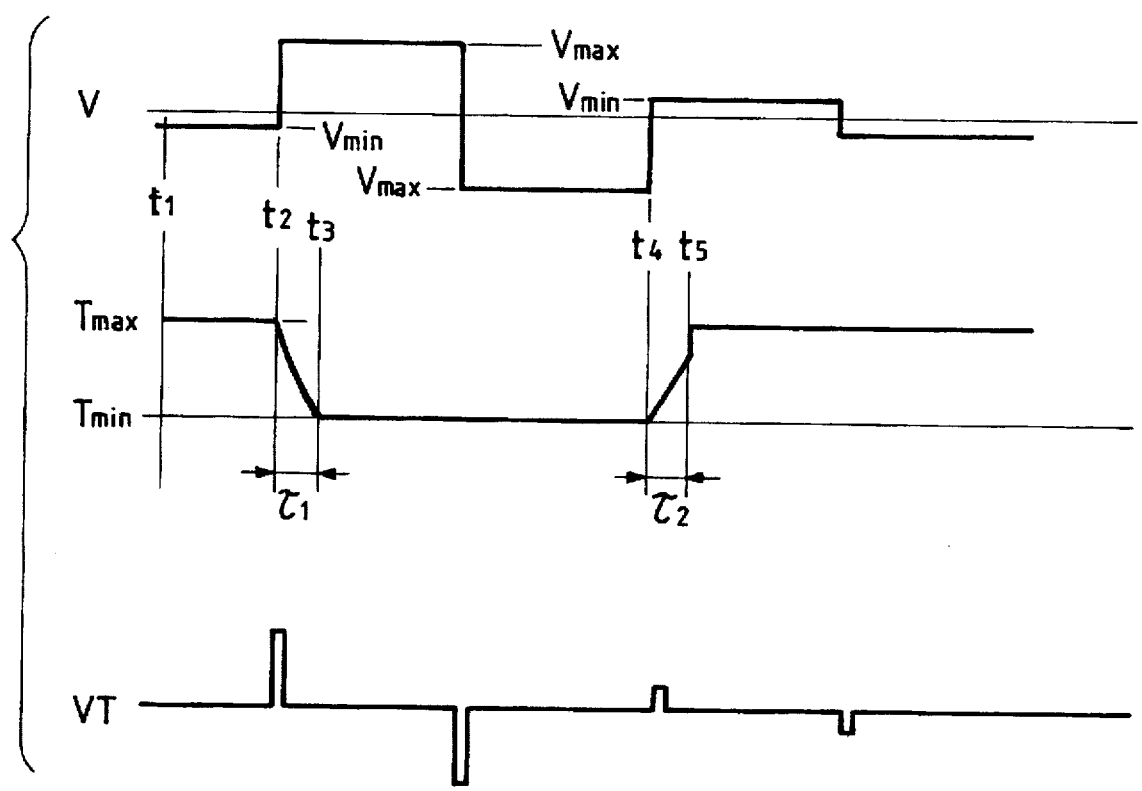
FIG. 20 shows the waveforms of a driving voltage signal applied to the picture element of liquid crystal and a light transmission output.

Further, FIG. 15 is an illustration of a case where the image I$_4$ is displayed as being in "one-frame stable state". At this time, an image picked up by the parallax image input camera lying, for example, at a position a" in FIGS. 19A and 19B is displayed as the image I$_4$ displayed on the image display D$_4$. At this time, the shutter ST$_4$ is in its transmitting (on) state and the shutters ST$_1$–ST$_3$ are in their non-transmitting (off) state. The second switching circuit 29 controls the light valve 23 and forms the aperture 24 at a position a. So, the exit pupil 27 is formed within the range of an observation area a' indicated by hatching in FIG. 15. That is, the exit pupil 27 returns to the range of the observation area a' indicated by hatching in FIG. 15. Therefore, if the observer's eye are within the range of the observation area a', the observer can observe the enlarged image 26 (=I$_4$") on the large convex lens 26. The time for which the shutter ST$_4$ is in its transmitting state is τ', which is ⅓ of the response time τ of the conventional art LCD.

In this manner, the states of FIGS. 12 to 15 are successively changed over and this cycle is repeated at high speed. The time required for one cycle in which the exit pupil 27 moves in the three observation areas a', b' and c' and returns to its original position is equal to the response time τ of the conventional-art LCD and therefore, the images displayed on the LCD can obtain sufficient contrast. Consequently, if the observer's eyes exist in one of the three observation areas, the observer can recognize the enlarged image 25 (=I$_1$"–I$_4$") having sufficient contrast as image information having a parallax.

However, the three observation areas a', b' and c' each are narrower than the width of the observer's both eyes and therefore, the observer's both eyes are disposed while being separated into two different observation areas as shown. As previously described, the enlarged images I$_1$", I$_2$", I$_3$" and I$_4$" observed in respective ones of the three observation areas include appropriate parallaxes, respectively, and thus the observer always observes two images having parallaxes independently with his right and left eyes. Therefore, stereoscopic viewing becomes possible by stereopairs such as the stereopair of enlarged images I$_1$" and I$_2$" and the stereopair of enlarged images I$_2$" and I$_3$".

Thus, in the present embodiment, a stereoscopic image reproducing apparatus is constructed by the use of a two-dimensional image display device shown in Embodiments 1 and 2 which can change over and display images at high speed, whereby there is achieved a stereoscopic image reproducing apparatus having many observation positions and capable of obtaining sufficient image contrast.

What is claimed is:

1. An image display device comprising:
   a plurality of image display means for displaying a plurality of bits of time-serial image information from image producing means;
   a plurality of shutter means arranged, corresponding to each of said plurality of image display means, wherein each of said plurality of shutter means makes a light beam from the corresponding image display means transmit or non-transmit therethrough;
   an imaging optical system for imaging said plurality of bits of time-serial image information on the same area on a common imaging plane; and
   control means for repeating to bring about a state in which only one of said plurality of shutter means transmits a light beam therethrough for a predetermined time with a predetermined time difference to thereby image said plurality of bits of image information successively on said imaging plane.

2. The device of claim 1, wherein said image display means have liquid crystal elements.

3. The device of claim 1, wherein said shutter means have ferroelectric liquid crystal elements.

4. The device of claim 1, wherein said control means simultaneously displays all the image information displayed on a displaying surface by each of said image display means by a predetermined period.

5. The device of claim 4, wherein said control means renders said plurality of shutter means effective to transmit for a predetermined time only when all the image information to be displayed on a surface of said image display means corresponding to said shutter means are displayed.

6. The device of claim 1, further comprising a screen having an optical diffusing surface on said common imaging plane.

7. An image display device comprising:
   a plurality of image display means for displaying a plurality of bits of image information obtained by one and the same object being image-picked up by the use of image pickup means having a plurality of picture elements with the picture elements deviated from one another by a predetermined pitch, or produced by an image producing process;
   a plurality of shutter means arranged, corresponding to each of said plurality of image display means, wherein each of said plurality of shutter means makes a light beam from the corresponding image display means transmit or non-transmit therethrough;
   an imaging optical system for imaging said plurality of bits of image information on the same area on a common imaging plane;

control means for repeating to bring about a state in which only one of said plurality of shutter means transmits a light beam therethrough for a predetermined time with a predetermined time difference to thereby image said plurality of bits of image information on said imaging plane; and moving means for moving said image display means or said imaging optical system in a plane perpendicular to the optical axis of said imaging optical system.

8. An image display device comprising:

a plurality of image display means for displaying a plurality of bits of information obtained by one and the same object being image-picked up by the use of image pickup means having a plurality of picture elements with the picture elements deviated from one another by a predetermined pitch, or produced by an image producing process;

a plurality of shutter means arranged, corresponding to each of said plurality of image display means, wherein each of said plurality of shutter means makes a light beam from the corresponding image display means transmit or non-transmit therethrough;

an imaging optical system for imaging said plurality of bits of image information on the same area on a common imaging plane; and moving means for moving said image display means or said imaging optical system in a plane perpendicular to the optical axis of said imaging optical system.

9. A stereoscopic image display apparatus comprising:

a plurality of image display means for displaying a plurality of bits of image information having parallaxes from image producing means;

a plurality of shutter means arranged, corresponding to each of said plurality of image display means, wherein each of said plurality of shutter means makes a light beam from the corresponding image display means transmit or non-transmit therethrough;

a screen having a diffusing surface;

an imaging optical system for imaging said plurality of bits of image information on the same area on the diffusing surface of said screen;

first imaging means for forming the image on said diffusing surface;

opening control means located at the pupil position of said first imaging means for controlling an opening means;

second imaging means for imaging the opening of said opening control means; and control means for repeating to bring about a state in which one of said plurality of shutter means transmits a light beam therethrough for a predetermined time with a predetermined time difference to thereby image said plurality of bits of image information successively on said diffusing surface, and varying said opening control means in synchronism with the operation of said shutter means.

10. The apparatus of claim 9, wherein said image display means have liquid crystal elements.

11. The apparatus of claim 9, wherein said shutter means have ferroelectric liquid crystal elements.

12. The apparatus of claim 9, wherein said control means simultaneously displays all the image information displayed on a displaying surface by each of said image display means by a predetermined period.

13. The apparatus of claim 12, wherein said control means renders said plurality of shutter means effective to transmit for a predetermined time only when all the image information to be displayed on a surface of said image display means corresponding to said shutter means are displayed.

* * * * *

UNITED STATES PATENT AND TRADEMARK OFFICE
CERTIFICATE OF CORRECTION

PATENT NO. : 5,719,701
DATED : February 17, 1998
INVENTOR(S) : Toshiyuki Sudo

It is certified that error appears in the above-indentified patent and that said Letters Patent is hereby corrected as shown below:

Col. 3, line 6, change "Will" to --will--.

Col. 14, line 29, change "$I_1$", "$I_4$" to --$I_1$ "-$I_4$"--.

Signed and Sealed this

Thirtieth Day of June, 1998

Attest:

Attesting Officer

BRUCE LEHMAN

Commissioner of Patents and Trademarks